(12) United States Patent
Caldera et al.

(10) Patent No.: US 10,187,369 B2
(45) Date of Patent: Jan. 22, 2019

(54) SYSTEMS AND METHODS TO AUTHENTICATE USERS AND/OR CONTROL ACCESS MADE BY USERS ON A COMPUTER NETWORK BASED ON SCANNING ELEMENTS FOR INSPECTION ACCORDING TO CHANGES MADE IN A RELATION GRAPH

(71) Applicant: IDM Global, Inc., Palo Alto, CA (US)

(72) Inventors: Jose Caldera, Palo Alto, CA (US);
Kieran Sherlock, Palo Alto, CA (US);
Neal Jared Reiter, San Jose, CA (US)

(73) Assignee: IDM GLOBAL, INC., Palo Alto, CA (US)

( * ) Notice: Subject to any disclaimer, the term of this patent is extended or adjusted under 35 U.S.C. 154(b) by 0 days.

(21) Appl. No.: 15/464,153

(22) Filed: Mar. 20, 2017

(65) Prior Publication Data
US 2018/0097790 A1    Apr. 5, 2018

Related U.S. Application Data

(60) Provisional application No. 62/429,555, filed on Dec. 2, 2016, provisional application No. 62/402,076, filed on Sep. 30, 2016.

(51) Int. Cl.
*H04L 29/06* (2006.01)
*H04L 29/08* (2006.01)

(52) U.S. Cl.
CPC .............. *H04L 63/08* (2013.01); *H04L 67/22* (2013.01); *H04L 2463/082* (2013.01)

(58) Field of Classification Search
CPC ....... H04L 63/08; H04L 63/10; H04L 63/102; G06F 21/30; G06F 21/44; G06F 21/70

USPC .................................................... 726/1–4, 9
See application file for complete search history.

(56) References Cited

U.S. PATENT DOCUMENTS

| | | |
|---|---|---|
| 5,963,915 A | 10/1999 | Kirsch |
| 6,021,397 A | 2/2000 | Jones et al. |
| 6,047,268 A | 4/2000 | Bartoli et al. |
| 6,076,068 A | 6/2000 | DeLapa et al. |
| 6,336,099 B1 | 1/2002 | Barnett et al. |

(Continued)

OTHER PUBLICATIONS

Fabian Monrose and Aviel D. Rubin, Keystroke Dynamics as a Biometric for Authentication, Mar. 1, 1999, 15 pages.

(Continued)

*Primary Examiner* — Jahangir Kabir
(74) *Attorney, Agent, or Firm* — Greenberg Traurig, LLP

(57) ABSTRACT

A controller for user authentication and access control, configured to: store data representing a graph having: nodes representing data elements associated with accesses made using an access token; and links among the nodes representing connections between the data elements identified in details of the accesses. In response to receiving details of an access made using the access token, the controller updates the graph according to the details and identifies changes in the graph resulting from update. For each of the changes, the controller identifies a set of elements in the graph that are up to a predetermined number of degrees of separate from the change and evaluates the trustworthiness of user identities corresponding to the set of elements identified for the change. Based on the trustworthiness, the controller authenticates the user of the access and/or controls the access.

17 Claims, 19 Drawing Sheets

(56) References Cited

U.S. PATENT DOCUMENTS

| | | | |
|---|---|---|---|
| 6,351,812 B1 | 2/2002 | Datar et al. | |
| 6,571,339 B1 | 5/2003 | Danneels et al. | |
| 6,691,915 B1 | 2/2004 | Thaxton et al. | |
| 6,862,575 B1 | 3/2005 | Anttila et al. | |
| 6,954,732 B1 | 10/2005 | DeLapa et al. | |
| 7,290,278 B2 | 10/2007 | Cahill et al. | |
| 7,356,507 B2 | 4/2008 | Bezos et al. | |
| 7,779,001 B2* | 8/2010 | Zeng | G06F 17/30864 707/726 |
| 8,639,629 B1 | 1/2014 | Hoffman | |
| 8,655,823 B1 | 2/2014 | Kumar | |
| 8,788,405 B1 | 7/2014 | Sprague et al. | |
| 8,850,043 B2* | 9/2014 | Rodriguez | H04L 63/105 709/229 |
| 8,965,883 B2 | 2/2015 | Si et al. | |
| 9,077,728 B1 | 7/2015 | Hart et al. | |
| 9,356,776 B2* | 5/2016 | Ko | H04L 9/0819 |
| 9,471,920 B2 | 10/2016 | Kolkowitz et al. | |
| 9,818,116 B2 | 11/2017 | Caldera | |
| 9,852,427 B2 | 12/2017 | Caldera | |
| 9,888,007 B2 | 2/2018 | Caldera | |
| 2001/0024785 A1 | 9/2001 | Keinath et al. | |
| 2002/0059130 A1 | 5/2002 | Cheng et al. | |
| 2002/0099649 A1 | 7/2002 | Lee et al. | |
| 2003/0149603 A1 | 8/2003 | Ferguson et al. | |
| 2003/0163691 A1 | 8/2003 | Johnson | |
| 2003/0187759 A1 | 10/2003 | Arthus et al. | |
| 2004/0010472 A1 | 1/2004 | Hilby et al. | |
| 2004/0117302 A1 | 6/2004 | Weichert et al. | |
| 2004/0199462 A1 | 10/2004 | Starrs | |
| 2005/0036615 A1 | 2/2005 | Jakobsson et al. | |
| 2005/0166065 A1 | 7/2005 | Eytchison et al. | |
| 2005/0278542 A1 | 12/2005 | Pierson et al. | |
| 2006/0031116 A1 | 2/2006 | Bogasky et al. | |
| 2006/0129686 A1 | 6/2006 | Tanaka | |
| 2006/0184428 A1 | 8/2006 | Sines et al. | |
| 2006/0282660 A1 | 12/2006 | Varghese et al. | |
| 2007/0022058 A1 | 1/2007 | Labrou et al. | |
| 2007/0220595 A1 | 9/2007 | M'raihi et al. | |
| 2007/0226248 A1 | 9/2007 | Darr | |
| 2008/0010678 A1 | 1/2008 | Burdette et al. | |
| 2008/0040275 A1 | 2/2008 | Paulsen et al. | |
| 2008/0046334 A1 | 2/2008 | Lee et al. | |
| 2008/0077515 A1 | 3/2008 | Zoldi et al. | |
| 2008/0084294 A1* | 4/2008 | Zhiying | G08B 21/12 340/539.22 |
| 2008/0140576 A1 | 6/2008 | Lewis et al. | |
| 2009/0048953 A1 | 2/2009 | Hazel et al. | |
| 2009/0089869 A1 | 4/2009 | Varghese | |
| 2009/0199296 A1 | 8/2009 | Xie et al. | |
| 2010/0094765 A1 | 4/2010 | Nandy | |
| 2010/0138340 A1 | 6/2010 | Shirey et al. | |
| 2010/0228580 A1 | 9/2010 | Zoldi et al. | |
| 2010/0293094 A1 | 11/2010 | Kolkowitz et al. | |
| 2010/0313246 A1* | 12/2010 | Irvine | H04L 63/102 726/4 |
| 2011/0251951 A1 | 10/2011 | Kolkowitz et al. | |
| 2011/0277014 A1* | 11/2011 | Tan | H04L 63/08 726/3 |
| 2013/0024364 A1 | 1/2013 | Shrivastava et al. | |
| 2013/0042298 A1* | 2/2013 | Plaza Fonseca | G06F 21/335 726/1 |
| 2013/0246454 A1 | 9/2013 | Menten | |
| 2014/0237570 A1 | 8/2014 | Shishkov et al. | |
| 2014/0280941 A1 | 9/2014 | Maguire | |
| 2014/0283026 A1 | 9/2014 | Striem Amit et al. | |
| 2014/0317676 A1 | 10/2014 | Nair et al. | |
| 2015/0081549 A1 | 3/2015 | Kimberg et al. | |
| 2015/0142767 A1 | 5/2015 | Wu et al. | |
| 2015/0220928 A1 | 8/2015 | Allen | |
| 2015/0287026 A1 | 10/2015 | Yang | |
| 2015/0310424 A1 | 10/2015 | Myers | |
| 2015/0324802 A1 | 11/2015 | Kolkowitz et al. | |
| 2015/0332256 A1 | 11/2015 | Minor | |
| 2015/0363876 A1 | 12/2015 | Ronca | |
| 2016/0021116 A1* | 1/2016 | Maguire | H04L 63/102 726/4 |
| 2016/0063500 A1 | 3/2016 | Sherlock et al. | |
| 2016/0071108 A1 | 3/2016 | Caldera et al. | |
| 2016/0104163 A1 | 4/2016 | Aquino et al. | |
| 2016/0119361 A1 | 4/2016 | Chao | |
| 2016/0191466 A1* | 6/2016 | Pernicha | H04L 63/20 726/1 |
| 2016/0203575 A1 | 7/2016 | Madhu et al. | |
| 2016/0371693 A1 | 12/2016 | Kolkowitz et al. | |
| 2017/0032274 A1 | 2/2017 | Yu et al. | |
| 2017/0132635 A1 | 5/2017 | Caldera | |
| 2017/0132636 A1 | 5/2017 | Caldera | |
| 2017/0140386 A1 | 5/2017 | Kolkowitz et al. | |
| 2017/0331828 A1 | 11/2017 | Caldera et al. | |
| 2018/0109507 A1 | 4/2018 | Caldera et al. | |

OTHER PUBLICATIONS

Fighting Fraud in today's Connected World, Entrust Jul. 2009.
What is Bitcoin? Barski, et al., Bitcoin for the befuddled, 2014.
Wikipedia, Dark web, Apr. 13, 2016, retrieved from https://web.archive.org/web/20160413084115/https://en.wikipedia.org/wiki/Dark_web.
Transaction Assessment and/or Authentication, U.S. Appl. No. 12/776,784, filed May 10, 2010, Dan Kolkowitz, et al, U.S. Pat. No. 9,471,920, dated Oct. 18, 2016.
Transaction Assessment and/or Authentication, U.S. Appl. No. 14/801,086, filed Jul. 16, 2015, Dan Kolkowitz, et al, Abandoned—Failure to Respond to an Office Action, dated Feb. 11, 2017.
Transaction Assessment and/or Authentication, U.S. Appl. No. 15/255,034, filed Sep. 1, 2016, Dan Kolkowitz, et al, Docketed New Case—Ready for Examination, dated Oct. 18, 2016.
Transaction Assessment and/or Authentication, U.S. Appl. No. 15/415,749, filed Jan. 25, 2017, Dan Kolkowitz, et al, Non Final Action dated Mar. 22, 2017.
Anti-fraud Event Correlation, U.S. Appl. No. 13/085,819, filed Apr. 13, 2011, Dan Kolkowitz, et al, Docketed New Case—Ready for Examination, dated Aug. 8, 2017.
Enhanced Automated Acceptance of Payment Transactions That Have Been Flagged for Human Review by an Anti-fraud System, U.S. Appl. No. 14/845,613, filed Sep. 4, 2015, Kieran Sherlock, et al, Non Final Action dated Jul. 6, 2017.
Enhanced Automated Anti-fraud and Anti-money-laundering Payment System, U.S. Appl. No. 14/846,169, filed Sep. 4, 2015, Jose Caldera, et al, Final Rejection dated May 2, 2017.
Systems and Methods for Sanction Screening, U.S. Appl. No. 14/938,593, filed Nov. 11, 2015, Jose Caldera, Notice of Allowance—Application Received in Office of Publications, dated Aug. 17, 2017.
Systems and Methods for Detecting Relations Between Unknown Merchants and Merchants with a Known Connection to Fraud, U.S. Appl. No. 14/949,305, filed Nov. 23, 2015, Jose Caldera, Notice of Allowance—Application Received in Office of Publications, dated Jul. 26, 2017.
Systems and Methods for Detecting Relations Between Unknown Merchants and Merchants with a Known Connection to Fraud, U.S. Appl. No. 15/811,541, filed Nov. 13, 2017, Jose Caldera, Application Undergoing Preexam Processing, dated Nov. 13, 2017.
Systems and Methods to Authenticate Users and/or Control Access Made by Users on a Computer Network Using Identity Services, U.S. Appl. No. 15/464,141, filed Mar. 20, 2017, Jose Caldera, et al, Non Final Action dated May 5, 2017.
Systems and Methods to Authenticate Users and/or Control Access Made by Users on a Computer Network Using a Graph Score, U.S. Appl. No. 15/464,193, filed Mar. 20, 2017, Jose Caldera, et al, Non Final Action dated May 17, 2017.
International Application No. PCT/US2017/030860, International Search Report and Written Opinion, dated Aug. 17, 2017.

(56) References Cited

OTHER PUBLICATIONS

International Patent Application No. PCT/US2017/056179, International Search Report and Written Opinion, dated Mar. 6, 2018.

* cited by examiner

SYSTEMS AND METHODS TO AUTHENTICATE USERS AND/OR CONTROL ACCESS MADE BY USERS ON A COMPUTER NETWORK BASED ON SCANNING ELEMENTS FOR INSPECTION ACCORDING TO CHANGES MADE IN A RELATION GRAPH

RELATED APPLICATIONS

The present application claims the benefit of the filing dates of Prov. U.S. Pat. App. Ser. No. 62/429,555, filed Dec. 2, 2016 and entitled "Systems and Methods to Authenticate Users and/or Control Access Made by Users on a Computer Network based on Scanning Elements for Inspection According to Changes Made in a Relation Graph", and Prov. U.S. Pat. App. Ser. No. 62/402,076, filed Sep. 30, 2016, and entitled "Enhanced Systems and Methods for Sanction Screening", the entire disclosures of which applications are hereby incorporated herein by reference.

The present application relates to U.S. Pat. App. Pub. Nos. 2010/0293094, 2011/0251951, 2015/0324802, 2016/0063500, and 2016/0071108, and U.S. patent application Ser. No. 14/938,593, filed Nov. 11, 2015, Ser. No. 14/949,305, filed Nov. 23, 2015, Ser. No. 15/255,034, filed Sep. 1, 2016, 62/336,059, filed May 13, 2016, and 62/409,294, filed Oct. 17, 2016, the entire disclosures of which applications are hereby incorporated herein by reference.

FIELD OF THE TECHNOLOGY

At least some embodiments disclosed herein relate generally to authentication of users on a computer network and more particularly, but not limited to, access control of users of access tokens used on the computer network.

BACKGROUND

The identity of a user in computerized access is typically authenticated based on the verification of a piece of information that can be shown to be in possession by an authorized user but is difficult for others to produce.

For example, an authentication credential in the form of a user name and a password is typically used in computer-based systems to authenticate a user. When the credential received from a user matches with the stored credential, the user is provided with the requested access to resources and/or privileges associated with the credential in a computer system. Authentication credentials may be in the form of secret data, security questions and answers, encryption keys, biometrics (e.g., fingerprints), etc.

However, there are risks of fraudulent use of authentication credentials, which may be stolen or hacked.

Further, in some computer systems, authentication credentials may not be connected to the real identities of the users as known in the society. In some systems, the lack of association between the authentication credentials and the real user identities is intentional to allow anonymous access and/or pseudonymous access. However, in some instances it may be desirable to deny access by certain users based on their real identities.

There is a challenge to authenticate users for computerized access and minimize the risk of fraudulent and/or illegal access at reduced costs.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding.

However, in certain instances, well known or conventional details are not described in order to avoid obscuring the description. References to one or an embodiment in the present disclosure are not necessarily references to the same embodiment; and, such references mean at least one.

At least some embodiments disclosed herein perform user authentication and/or access control based on contextual information related to various instances of accesses to reduce fraudulent activities. The user authentication and/or access control methods can be used in combination with traditional authentication methods that require authentication credentials and can be used independent from the traditional authentication methods.

Figure 1:
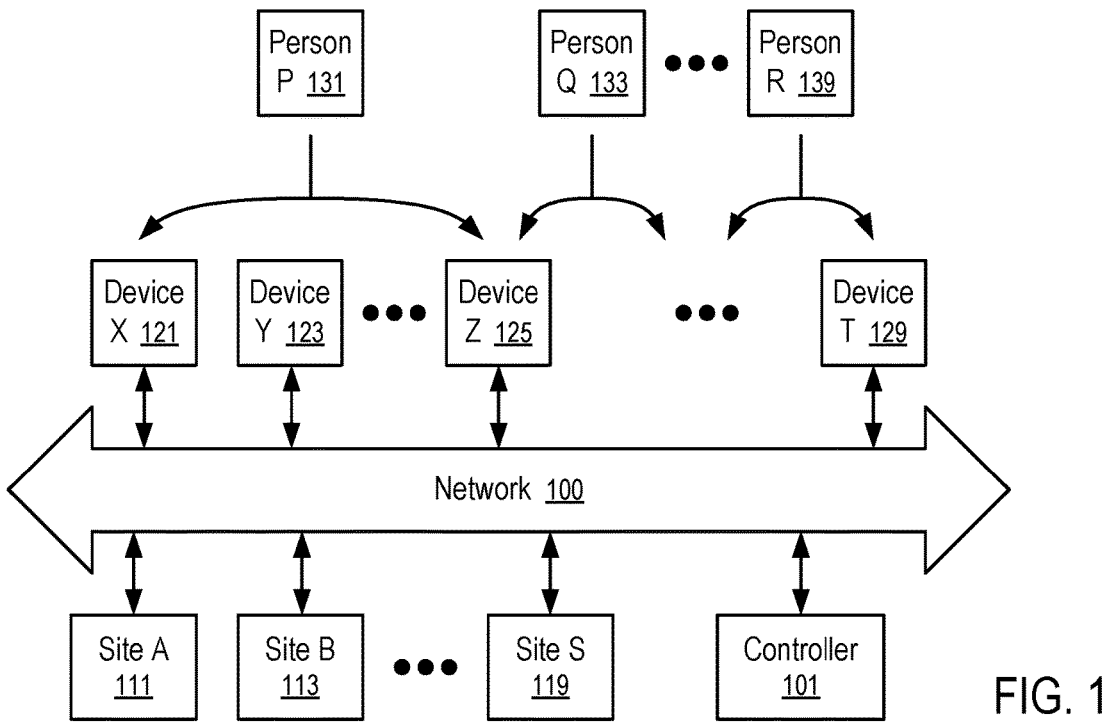
FIG. 1 shows a computer system in which user authentications methods of various embodiments disclosed herein can be performed.

FIG. 1 shows a computer system in which user authentications methods of various embodiments disclosed herein can be performed.

In FIG. 1, a set of computing devices (e.g., 121, 123, . . . , 125, . . . , 129) can be used by different persons (e.g., 131, 133, . . . , 139) to gain access, over the computer network (100), at computing sites (e.g., 111, 113, . . . , 119). The computing sites may provide different and/or related services.

A user (e.g., person (131)) may use multiple devices (e.g., 121, 123, . . . , 125) to access some of the services provided on the sites (e.g., 111, 113, . . . , 119).

A computing device (e.g., 125) may be used by different persons (131 and 133) to access a same set or different sets of services provided on the computing sites (e.g., 111, 113, . . . , 119).

The devices (e.g., 121, 123, . . . , 125, . . . , 129) may be used at different geographical locations and/or network locations and can be relocated to different geographical locations and/or network locations for continued access by the same persons and/or by different persons at different time instances.

Typically, an access token is provided to a user to indicate the access privileges of the user. The presentation of an access token by a user represents an access request, transaction, or session made in accordance with the predefined privileges associated with the token. For example, an access token may represent an account based on which certain information or asset may be accessed, such as applications, games, emails, advices, account details, entertainments, funds, virtual currencies, and/or other benefits. When the request for access made via the access token is granted, the user may start a session, an activity, or a transaction to access privileged information, functionality of a computing site, and/or other assets. For example, the access may allow the user to run an application, consume information/data, transmit a message to another user, make an asset exchange/trade, and/or make or receive a payment, etc.

At least some embodiments disclosed herein use the contextual information received in connection with access requests; and the data elements in the contextual information are correlated and/or connected to each other to provide enhanced capability of user authorization and access control.

Contextual information of an access request generally include information that can be collected during the processing of the access request and/or during the session, activity, or transaction where the access is provided as a result of the access request being granted. Examples of such contextual information includes the identification of an access token used to make the access request, the identification information of the device from which the access token is received, the network identification information of the device at the time the access request is received, the geographical location of the device determined by its location determination unit (e.g., a global positioning system (GPS) receiver), characteristics of user input activities during the session, activity, or transaction, etc.

In some instances, the access made by a user (e.g., 131) using a device (121) includes the interaction of the user (e.g., 131) with one or more other users (e.g., 139) who use other devices (e.g., 129). Thus, the contextual information may further include the information collected about the other devices (e.g., 129) used by the other users (e.g., 139).

The correlation and/or connection of the contextual information of accesses made using various access tokens on various user devices can enhance the identity recognition of the persons behind the access requests and improve user authentication to prevent fraudulent and/or illegal accesses.

For example, a controller (101) in FIG. 1 is configured in one embodiment to communicate with the computing sites (111, 113, . . . , 119) and use the contextual information to perform enhanced user authentication and/or access control that further reduces fraudulent activities on the computing sites (111, 113, . . . , 119). The computing sites (111, 113, . . . , 119) may optionally implement additional user authentication and/or access control methods (e.g., using authentication credentials) independent from the user authentication and/or access control implemented on the controller (101).

In some instances, at least some of the accesses are made on a peer to peer network of some of the devices (121, 123, . . . , 125, . . . , 129). The peer to peer network may be configured to allow anonymous access and/or pseudonymous access. Through correlation/connection of data elements of contextual information of accesses made on the anonymous/pseudonymous network(s) and respective data elements of contextual information of accesses made on other networks, the user authentication capability of the controller (101) can be improved.

In some instances, the controller (101) is implemented as an independent computing site, or a collaborative module implemented within or among the computing sites (111, 113, . . . , 119).

Figure 2:
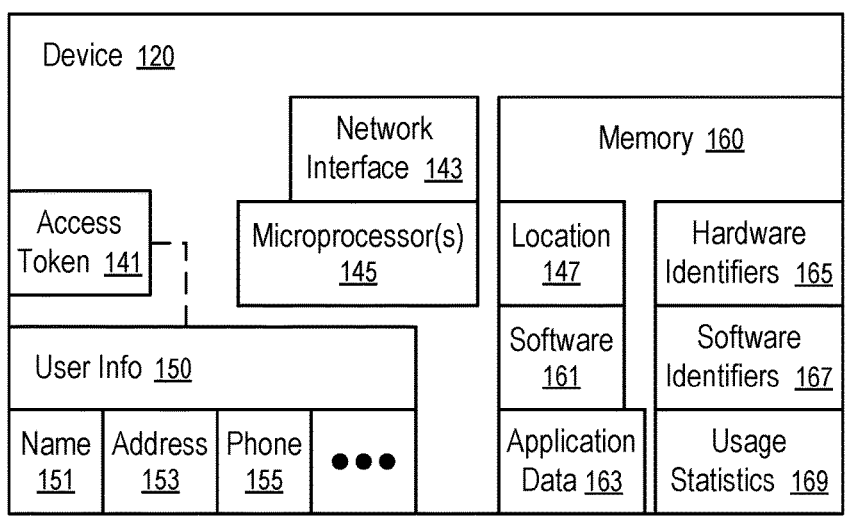
FIG. 2 shows a user device via which user authentications methods of at least some embodiments disclosed herein can be performed.

FIG. 2 shows a user device via which user authentications methods of at least some embodiments disclosed herein can be performed. For example, one or more of the user devices (121, 123, . . . , 125, . . . , 129) can be implemented in a way similar to the implementation of the user device (120) illustrated in FIG. 2, with or without modifications.

In FIG. 2, the device (120) includes memory (160) storing software (161), at least one network interface (143) to communicate via a network (100), one or more microprocessors (145) to execute the software (161) stored in the memory (160). The software (161) typically includes an operating system and one or more applications running on top of the operating system. The memory (160) stores the software identifiers (167) that identify at least some of the software (161) configured in the memory (160), hardware identifiers (165) identifying hardware components of the device (120), and other information, such as usage statistics (169) of the hardware and/or software (161) of the device (120), and application data (163) generated by and/or configured for the applications executed by the microprocessors (145) in the device (120).

In some instances, the device (120) optionally further includes position determination devices (e.g., GPS receiver) to determine its current location (147), sensors to generate measurements (e.g., background noise, user biometrics input, images, etc.).

Some of the computing sites (e.g., 111, 113, . . . , 119) may require the registration of user information (150) (e.g., the name (151) of the registered user of the access token (141), a street address (153) of the user, a phone number (155) of the user) in order for the user to obtain and/or use the access token (141). In some instances, some of the user information (150) is required to facilitate the access to the service provided by a respective site, such as making a purchase to have an item shipped to an address. In an anonymous/pseudonymous site or network, user registration may be not required; and some or all of the user information (150) may be not available in the context of an access on the anonymous/pseudonymous site or network. Different computing sites (e.g., 111, 113, . . . , 119) may be configured to use different access tokens (e.g., 141).

In general, different persons (e.g., 131 and 133) may share an access token (e.g., 141) on one or more devices (e.g., 123, 125). The same token (141) may be used on different devices (e.g., 123, . . . , 125) by the same person (131) or different persons (e.g., 131 and 133). Thus, it is a challenge to prevent fraudulent uses of the access tokens (e.g., 141).

At the time an access is made using the access token (141) (e.g., in the form of an account identifier or a resource identifier), the device (120) of one embodiment is configured to provide contextual data related to the access to the controller (101) (e.g., directly, or indirectly via a computing site where the access is made). The contextual data may include some of the data collected and/or stored in the memory (160), such as the hardware identifiers (165), the software identifiers (167), the usage statistics (169), the location (147), the user information (150), etc. In a way the contextual data represents an electronic signature of the device (120) at the time of the access and/or a set of user attributes of the user using the token (141) to gain the access. The controller (101) makes use of the contextual information to improve user authentication and/or access control as discussed further below.

For example, data associated with an access made using an access token can be collected to build a representation of the user who is associated with the access token in the access (e.g., a transaction). The data associated with the access can be seen in the network and/or the access activity and analyzed and/or used to create an electronic signature of the user. Exemplary attributes of such data include, but are not limited to, browser fingerprints, computer fingerprints, IP addresses, geographic IP location information, information associated with a payment, and/or a typing pattern when entering data in fields related to the payment or other fields. Browser fingerprints may include attributes associated with an individual's browser that may be extracted using standard interfaces. For example, browser fingerprints may include characteristics such as user agent (includes browser and operating system), screen resolution, software plug-ins (in a manageable state), time zone, system language, whether Java is enabled, whether cookies are enabled, sites visited, and/or IP address. The present disclosure contemplates that matching browser fingerprint characteristics in a subsequent interaction with those collected during a prior interaction may indicate a high probability that the same browser and/or device was used in both the prior and subsequent interactions.

Some exemplary computer fingerprints may allow a determination of whether a physical machine is the same as one that has been seen in the past. Computer fingerprints may include, for example, processor characteristics (e.g., model number, version, speed, cache size serial number, etc.), memory size of the machine, values that are loaded at key locations, values of the registry of the loaded operating system, Ethernet MAC (media access control) address, raw networking and network information (e.g., configuration parameters), loaded programs, and/or log files. Some exemplary embodiments may utilize performance on specified benchmark program fragments, such as by measuring the performance of a program that includes different characteristics including input/output and CPU (Central Processing Unit) speed. Such an approach may take into account the other processes running on a user's machine, the amount of memory, etc., and it may provide reproducible results so that it may act as a part of a fingerprint. Example information associated with an online activity may include behaviors observed on entered information (e.g., typing rhythms, billing addresses entered, cards used, passwords or PINs (Personal Identification Number) stored and/or requested), Zip code, full name entered, and/or loaded versus empty fields on entering information (for example, the browser may have the previously entered values from the last instance of the user). This can be seen to be entered by the browser rather than typing by the speed of entry of the characters. In some exemplary embodiments, the electronic signature may uniquely identify the user at the same merchant in future transactions and/or at other merchants where the same attributes can be seen.

By associating a particular access token and/or a device identity with a known user identity (e.g., represented by his or her electronic signature), the controller can determine whether or not the access token used in a particular instance of access is known to belong to the current user who is presenting the access token.

In some instances, the lack of correlation between the newly collected electronic signature and any previously collected electronic signature may be used to identify instances of access that may merit further assessment. For example, if the newly collected electronic signature correlates with a known, previously collected electronic signature of a different user (e.g., a user other than the user involved in the current instance of access), the current access may be flagged for further assessment, such as further determination of whether or not fraud is involved or whether additional fraud checks need to be performed.

Figure 3:
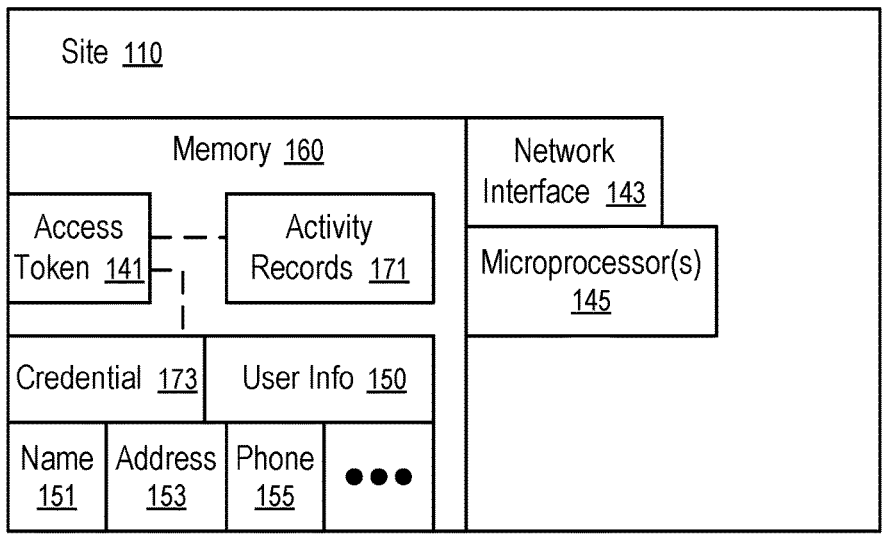
FIG. 3 shows a computing site, access on which can be controlled via user authentications methods of at least some embodiments disclosed herein.

FIG. 3 shows a computing site, access on which can be controlled via user authentications methods of at least some embodiments disclosed herein. For example, the site (110) illustrated in FIG. 3 may be one of the computing sites (11, 113, . . . , 119) illustrated in FIG. 1.

In FIG. 3, the site (110) includes at least one network interface (143) to communicate via the network (100), one or more microprocessors (145) to execute instructions of software configured for user authentication and/or access control, and memory (160) storing the software instructions and data relates to user authentication and/or access control.

For example, the access token (141) that may be used by a user on the device (120) can be secured at least in part via the credential (173) associated with access token (141). The credential (173) is typically used to verify whether the user is in possession of a piece of information associated with the access token (141). For example, the credential (173) may include a secret (e.g., password, biometrics, passcode, security code) that is assumed to be available only to the authorized user of the access token (141). For example, the credential (173) may include a public key that can be used to verify the user of the device (120) is in possession of a respective private key using a predetermined asymmetric cryptography algorithm. In some instances, the access token itself is considered a secret (e.g., an account number) that is used to authenticate the user and/or control access.

In some instances, the computing site (110) requires user registration to associate the access token (141) with user information (150), such as the name (151) of the registered user of the access token (141), a street address (153) of the user, a phone number (155) of the user, etc. However, when the access token (141) is shared by a number of persons (e.g., 131 and 133), the registered user information (150) may not accurately identify the actual user of a particular instance of an access made via the access token (141). In some instances, fraudulent user information (150) may be used in registration; and in other instances, one or more services of the site (110) may be provided via anonymous/pseudonymous access, and thus the user registration is optional and/or not performed.

In FIG. 3, the computing site (110) tracks the activity records (171) of the accesses made using the access token (141). The activity records (171) include the contextual information collected from the device (e.g., 120) when the accesses are made using the access token (141). The activity records (171) can be used in the controller (101) to implement enhanced user authentication and/or access control using methods disclosed herein.

In some instances, activity records may be stored in a distributed network of devices (e.g., 121, . . . , 129). For example, transaction records of cryptocurrency can be implemented as a blockchain in the form of a distributed database that maintains blocks of records and contain timestamp and a secure hash based history to prevent tampering and revision.

For example, the access may be made on the device (120) using a web browser that runs a client code (e.g., a plug-in application, an applet, a script running in a web page) to collect contextual data (e.g., a fingerprint of the device (120), available user data related to the access). The contextual data for the access is transmitted to the site (110) and/or the controller (101) in connection with the use of the access token (141) and stored as part of the activity records (171) that is specific for the access from the device (120). Some examples of implementations to collect the contextual data and its use for user authentication and access control can be found in U.S. Pat. No. 9,471,920, entitled "Transaction Assessment and/or Authentication", the entire disclosure of which is hereby incorporated herein by reference.

Figure 4:
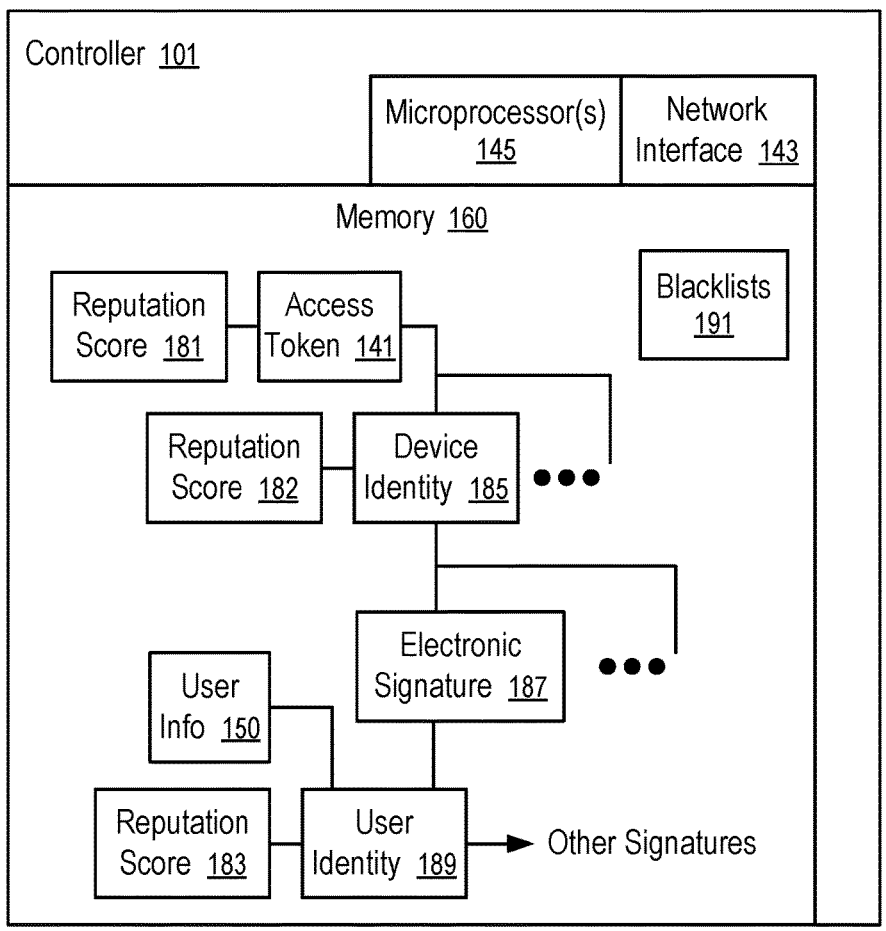
FIG. 4 shows a controller for user authentication and/or access control according to at least some embodiments.

FIG. 4 shows a controller for user authentication and/or access control according to at least some embodiments.

In FIG. 4, the controller (101) includes at least one network interface (143) to communicate on the network (100), one or more microprocessors (145) to execute instructions of software configured for user authentication and/or access control, and memory (160) storing the software instructions and data relates to user authentication and/or access control.

For example, the memory (160) of the controller (101) stores data representing a graph of elements collected in connection with the use of access tokens (e.g., 141).

Based on the activity records (171) received from computing sites (e.g., 111, 113, . . . , 119) and/or the computing devices (121, 123, . . . , 125) on which the access token (141) is used, the controller (101) connects the access token (141) to devices identities (185) of devices (e.g., 121, . . . , 125) from which the access token (141) is received for access, and the user identities (189) of users using the respective devices (e.g., 131, 133).

In FIG. 4, a device identity (185) represents a device (e.g., 125) that is identified by an electronic signature (187) of the device. The electronic signature (187) includes data elements, extracted from the contextual data of an access made using the access token (141), that are combined to identify a physical device (e.g., 120) from which the access token (141) is submitted from access.

For example, the data elements of the electronic signature (187) may include the hardware identifiers (165), software identifiers (167), configuration data of the software and/or hardware of the device (120), etc.

For example, the data elements of the electronic signature (187) may include one or more of browser fingerprints, computer fingerprints, IP addresses, phone numbers, ESNs (electronic serial numbers of mobile devices), IMEIs (international mobile station equipment identity), SIM (subscriber identification module), etc.

The identifications of devices (e.g., 121, . . . , 125) in combination with further data specific to users, such as geographic IP location information, emails, SSNs (Social Security number), TINs (taxpayer identification number), date of birth, activities made in connection with the granted access, typing patterns, biometrics, facial image, voice pattern, etc., tell apart the actual users of the access token (141) and/or the devices (e.g., 121, . . . , 125) represented by the device identify (e.g., 185).

In general, an access token (141) is connected to a plurality devices identities (e.g., 185) corresponding to a different physical devices (e.g., 121, . . . , 125) from which the access token (141) is submitted to request access. Each of the devices represented by a device identity (185) having one or more electronic signatures (187) may be used by more than one person represented by respective user identities (e.g., 189) having the user information (150). Thus, a user identity (189) may be connected to multiple electronic signatures (e.g., 187) of one or more devices.

In some instances, some of the user information (150) is obtained via the user registration process. In some instances, some of the user information (150) is obtained via correlating with identification information (e.g., facial images, thumbprints, voice pattern, type pattern, government issued identification number, biometrics,) with user information obtain from third party database. In some instances, some of the user information (150) is obtained via form data of online activities related the access/services provided via the access token, such as the shipping and/or billing address for online purchases.

In FIG. 4, based on reports on the consequences of providing accesses made via the access token (141), providing access by receiving access token (141) from devices represented by the device identities (e.g., 185), and providing access to persons represented by user identities (189), the system may generate reputation scores (e.g., 181) for access tokens (e.g., 141), reputation scores (e.g., 182) for the device identity (185), and reputation scores (e.g., 1830 for the user identity (189). In one embodiment, the reputation score of an access token (141), a device identity (185), or a user identity (198) represents the probability that an access made via the access token (141), the device identity (185), or the user identity (198) has a undesirable consequence.

In processing the user authentication and/or access control of a specific instance of the use of the access token (141), the controller (101) extracts the data fields from the contextual data received in connection with the instance of the use of the access token (141) and determines the matching device identity (e.g., 185) and/or the matching user identity (e.g., 189). Based on the degree of matching and the reputation scores of the access token (141), the device identity (e.g., 185) and the user identity (e.g., 189), the controller (101) determines a trust score for the specific instance of the use of the access token (141). Based on the trust score, the controller (101) authenticates the user and/or controls the access.

In FIG. 4, the memory (160) of the controller (101) stores one or more blacklists of fraudulent elements. The controller (101) may further authenticates the user and/or controls the access based on blacklisted data elements in the graph that are connected to the contextual data received from the specific instance of the use of the access token (141).

Figure 5:
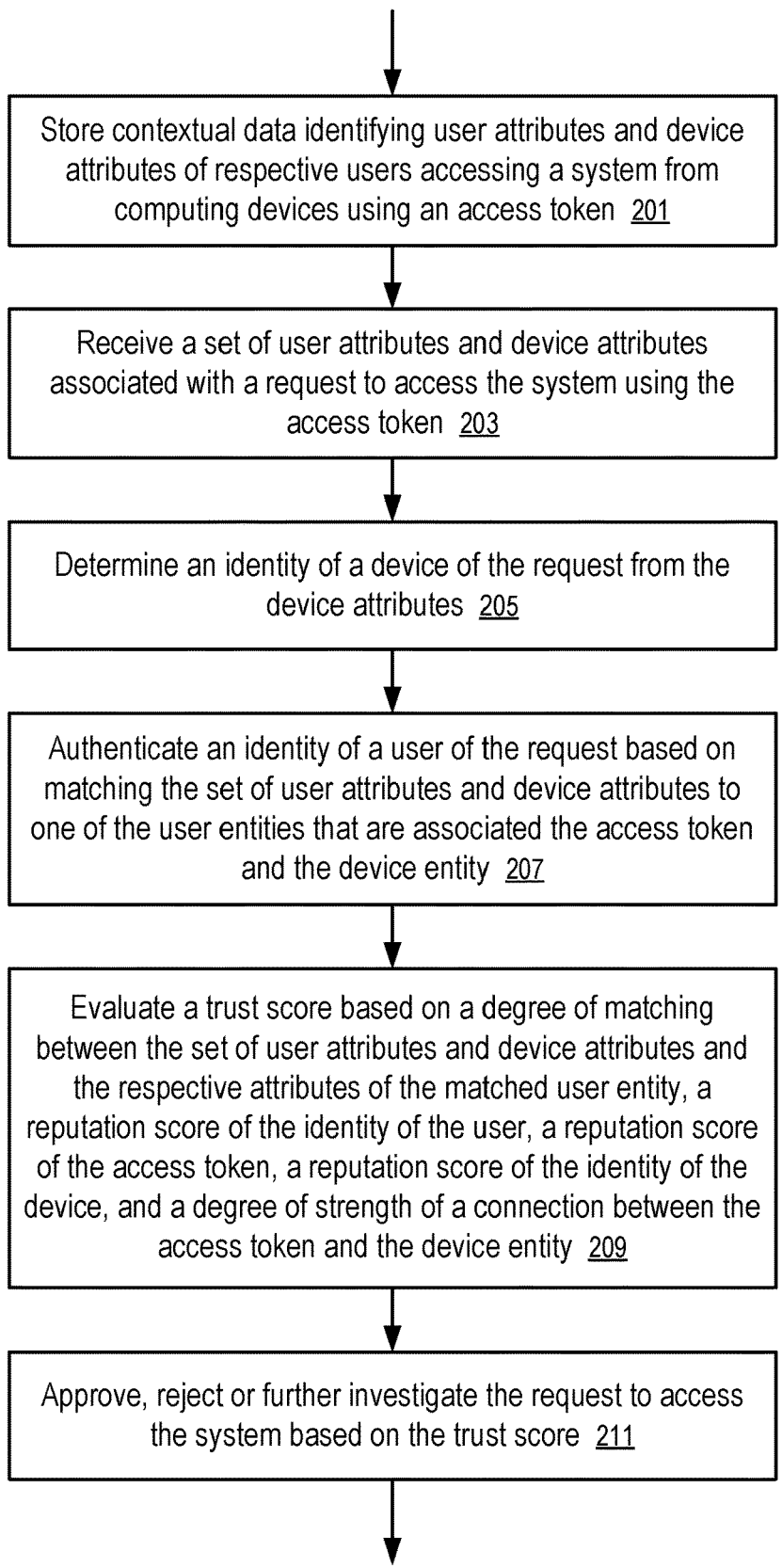
FIG. 5 shows a method to control access based on electronic signatures according to one embodiment.

FIG. 5 shows a method to control access based on electronic signatures according to one embodiment. For example, the method of FIG. 5 can be used in the system illustrated in FIG. 1, with computing devices (121, 123, ..., 125, ..., 129) implemented as illustrated in FIG. 2 and sites (e.g., 111, 113, ..., 119) implemented as illustrated in FIG. 3, and a controller (101) implemented as illustrated in FIG. 4.

In FIG. 5, the controller (101) is configured to store (201) contextual data identifying user attributes (e.g., user information (150)) and device attributes (e.g., electronic signatures (187)) of respective users (e.g., 131, 133, ..., 139) accessing a system from computing devices (e.g., 121, 123, ..., 125, ..., 129) using an access token (e.g., 141). The system has one or more computing sites (111, 113, ..., 119) that may provide separate services. The controller (101) associates the device attributes with respective entity representations of devices (e.g., 121, 123, ..., 125, ..., 129) and the user attributes with respective entity representation of respective persons (e.g., 131, 133, ..., 139).

In response to receiving (203) a set of user attributes and device attributes associated with a request to access the system (e.g., the computing site (110)) using the access token (141), the controller (101) determines (205) an identity (e.g., 185) of a device of the request from the device attributes and authenticates (207) an identity of a user of the request based on matching the set of user attributes and device attributes to one of the user entities (e.g., 189) that are associated the access token (141) and the device entity (185). The computing site (110) may optionally use the credential (173) to preliminary authenticate the user. The set of user attributes and device attributes transmitted, as the contextual data specific for the current request made using the access token (141), to the controller (101) (e.g., via the site (110), or directly from the user device (121, 123, ..., 125, or 129)).

The controller (101) is further configured to evaluate (209) a trust score based on a degree of matching between the set of user attributes and device attributes and the respective attributes of the matched user entity (189), a reputation score (183) of the identity (189) of the user (e.g., 131, 133, ..., or 139), a reputation score (181) of the access token (141), a reputation score (182) of the identity (185) of the device, and a degree of strength of a connection between the access token (141) and the device entity (185).

Based on the trust score, the controller (101) approves, rejects or further investigates (211) the request to access the system.

For example, the access token (141) may be an online account for accessing an online account having services provided by a computing site (e.g., 111, 113, ..., 119), an email address for accessing emails, a user name for accessing instant messages, an account number for online access of a social networking site, an account with an online merchant to purchase items or services, an account number to make a payment, a token of a cryptocurrency for a transaction, etc.

In one embodiment, each attribute is assigned a predetermined weight. A degree of matching is computed in the form of a matching score that is a function of the sum of the weights of the matched attributes (Wa), the sum of the weights of the mismatched attributes (Wb), the sum of the weights of the attributes that have no data for the current access request (Wc), and the sum of the weights of all attributes (Wd). For example, the matching score of one embodiment is computed as a function of (Wa*Wa−2*Wb−Wc)/(Wd*Wd).

The user entity (189) having the highest matching score for the current access request can be considered the user entity (189) of the current access request. The matching can be performed based on user attributes such as name of the user, billing and/or shipping address of the user, phone number and/or email address of the user, typing rhythm of the user, account name of the user, device fingerprint, browser fingerprint, IP Address, Geo-location of the IP address, Geo-location of the browser/device, etc.

For example, a browser fingerprint may include at least one of a user agent, a screen resolution, a software plug-in, a time zone, a system language, whether Java is enabled, whether cookies are enabled, a site visited, and an IP address.

For example, a fingerprint may include at least one of a processor characteristic, a memory size of the machine, a value that is loaded at a key location, a value of a registry of a loaded operating system, an Ethernet MAC address, raw networking information, network information, a loaded program, and a log file.

Examples of network information include a network provider, whether an IP address is consistent with a known IP address, a geographical proximity of an address registered with a payment instrument and the IP address as determined by an IP to Geo-location service, whether or not a proxy is in use, whether a known bad IP address is in use, and whether the IP address is associated with a service provider who was associated with the user in the prior transaction.

Further examples of the computing of a matching score and the rules for approving, rejecting or further investigating (211) the request to access the system can be found in U.S. Pat. No. 9,471,920, entitled "Transaction Assessment and/or Authentication", the entire disclosure of which is hereby incorporated herein by reference.

Figure 6:
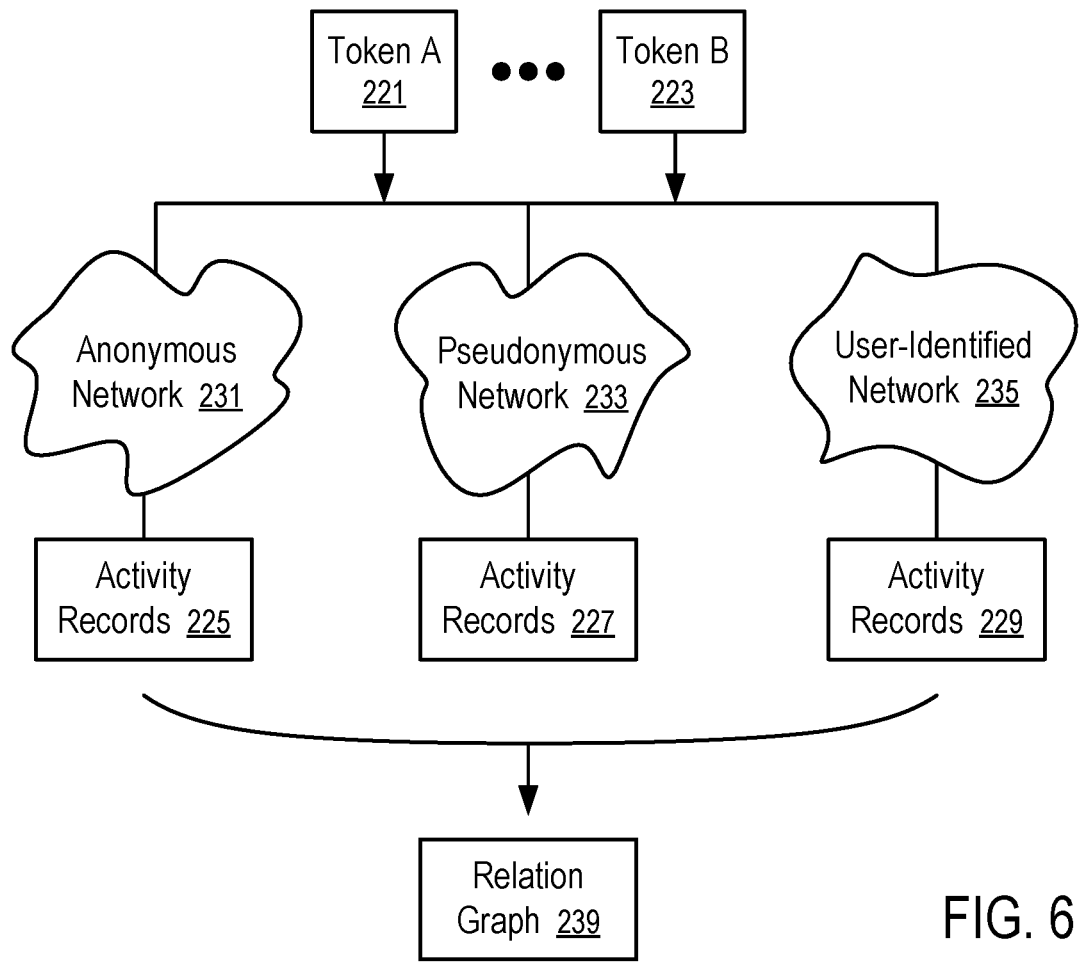
FIG. 6 illustrates the generation of a relation graph for user authentication and/or access control according to at least some embodiments.

FIG. 6 illustrates the generation of a relation graph for user authentication and/or access control according to at least some embodiments. For example, the relation graph can be generated using the contextual information discussed in connection with FIG. 4.

In FIG. 6, different access tokens (e.g., 221, ..., 223) can be used by users (e.g., 131, 133, ..., 139) of different devices (121, 123, ..., 125, ..., 129) to access various networks, such as anonymous network (231), pseudonymous network (233), user-identified network (235).

For example, the user-identified network (235) may include one or more sites (e.g., 110) that require user registration to provide services. The user registration may or may not include a level of effort in verifying the user information (150). Thus, the user information (150) obtained via the registration process may have varying degrees of reliable in accuracy.

The anonymous network (231) and pseudonymous network (233) generally provide enhanced privacy protections for their users by allowing various degrees of anonymity in activities on their network. Thus, the availability of the user information (150) is generally low for the respective activities.

In FIG. 6, the activity records (225, 227, 229) of the access activities made using the tokens (221, ..., 223) are combined to generate a relation graph (239) that links the device entities (e.g., 185) and user entities (189) through common attributes (187) in contextual data to reveal the connections among the entities (185, 189) and tokens (e.g., 221, . . . , 223), as further discussed below.

For example, online activities and/or accesses may involve cryptocurrency, such as Bitcoins. Bitcoins transactions can be performed pseudo-anonymously (see https://en.wikipedia.org/wiki/Cryptocurrency), where two users can transfer Bitcoins to each other without revealing the identity of either of them. The transaction is cryptographically signed to ensure that the transaction took place, and there is a public record of such transaction that can be verified by all players on the Bitcoin infrastructure. Thus, the activity records of accesses made on such sites (e.g., Bitcoin Exchange) may not have real user identification information.

A cryptocurrency is a medium of exchange designed around securely exchanging information over a computerized network, which is made possible by certain principles of cryptography. Cryptocurrencies are based on specifications regarding the use of currency which seek to incorporate principles of cryptography to implement a distributed, decentralized and secure information economy. An example of cryptocurrency is Bitcoin, which is used in a peer-to-peer payment system. The payments in the system are recorded in a public ledger. The Bitcoin system is a decentralized virtual currency, because it has no central repository and no single administrator. In contrast, FIAT money is money which derives its value from government regulation or law. It differs from commodity money, which is based on a good, often a precious metal such gold or silver, which has uses other than as a medium of exchange.

When users want to exchange their Bitcoins to FIAT currency (or FIAT money) they would have to use a Bitcoin Exchange or a Bitcoin Wallet-hosting company that enables exchanging Bitcoins into FIAT currency. Such exchanges are regulated by governmental bodies in many countries to capture information about the users, via an activity known as "Know Your Customer" or KYC. Thus, the activity records of accesses made on such sites (e.g., Bitcoin Exchange) have user identification information.

The relation graph (239) connects the elements from various networks (225, 227, 229) and allows the controller (101) to monitor activities involving anonymous and/or pseudonymous accesses for monitoring of fraudulent accesses. For example, using the controller (101), organizations/individuals that enable exchanging Bitcoins for FIAT currency, and vice versa can monitor "financial" transactions for potential money laundering activities and/or other suspicious activity, such as fraud.

In one embodiment, a statistical analysis of the activities records (225, 227, 229) is performed to identify a cluster of activities that are naturally grouping together for being close to each other based on attributes of the activities (e.g., the data items describing the respective activities in the activity records). For example, a cluster of Bitcoin (or other currency) addresses and/or transactions can be identified for grouping the respective activity records together. The transactions and/or Bitcoins in the cluster are statistically related based on the available data associated with them. The grouped activity records can be assembled into a relation graph for the cluster, which can be used in various user authentication and access control methods disclosed herein. Alternatively, the activity records (225, 227, and 229) can be assembled into a large relation graph (239) from which graphlets of interest can be extracted.

For example, when an individual is known or suspected to be involved with fraudulent or illegal access, the access tokens, device identities and/or user identities used by the individual can be identified. When a cluster of activities includes the access tokens, device identities and/or user identities used by the individual, the other individuals involved in the cluster may be shown to be related and potentially involved in illegal or fraudulent access.

Similarly, if a cluster is observed, first, as potentially tied to fraudulent or illegal access, the relation graph (239) can be used to map the activities to real people as identified in the user-identified network (e.g., persons submitting the transactions in Bitcoin exchanges). This establishes a correlation of attributes which are seemingly unrelated. The real people involving in the related activities can be investigated as potentially being involved with the fraudulent or illegal access. The attributes involved with the related activities (e.g., transactions obtained via the KYC and the submitted data) can be scrutinized in other activities as then being related to questionable activities.

Figure 7:
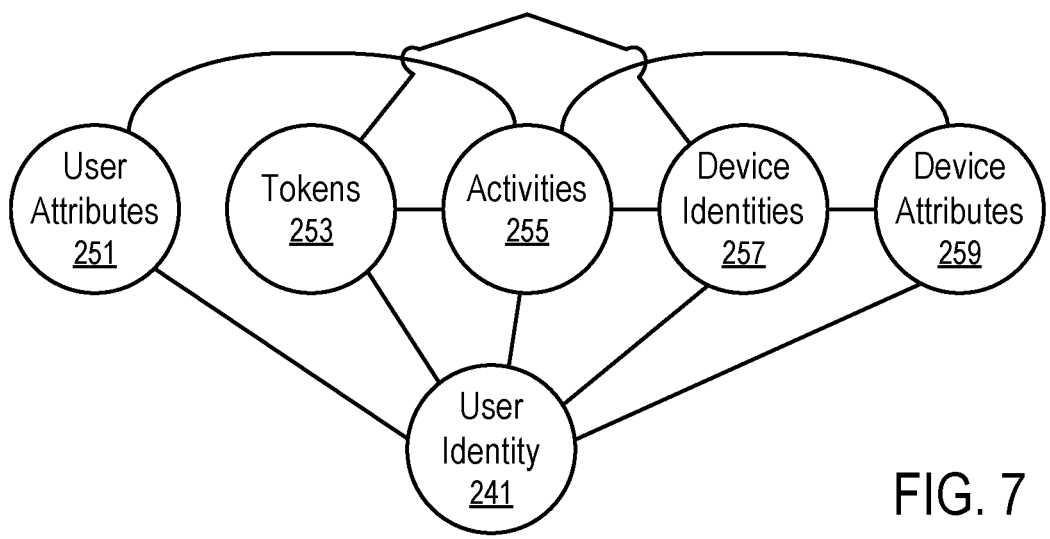
FIG. 7 illustrates a portion of a relation graph related to a user identity according to one embodiment.

FIG. 7 illustrates a portion of a relation graph related to a user identity according to one embodiment. Via contextual data received in connection with the access requests made using the tokens, a user identity (241) having the user attributes can be linked in a relation graph to activities (255) of the user identity (241), the tokens (253) used by the user identity (241), the identities (257) of devices from which the tokens (253) have been submitted by the user identity (241) to request accesses, the device attributes (259) of the devices having the device identities (257). Some of the user attributes (251) are obtained as activity-specific data in connection with respective activities. Some of the user attributes (251) are obtained from user registration process and/or third party database. Some of the device attributes (259) are obtained as contextual data of the activities (255).

FIG. 7 is provided to generally illustrate the connections among some of the elements. In some instances, certain connections are missing for a user entity; and in other instances, additional connections may be present.

In FIG. 7, one connection is used to illustrate the connection between a group of elements (e.g., tokens (253)) and the user identity (241) or another group of elements (e.g., activities (255)). In general, each element (e.g., token (141)) may be linked to other elements in the graph in a way different from other elements in the group. For example, a given token (141) may be connected to a subset of activities (253) different from other subsets of activities (255) to which another token (e.g., 221) in the group (e.g., tokens (253)). Thus, the illustration provided in FIG. 7 does not represent the specific connections among different items represented by the groups of items.

Common elements of portions of the graph related to different users identities can link the portions and establish connections between user identities, device identities, access tokens, etc. The connection relations identified in the graph can be further used for user authentication and/or access control.

Figure 8:
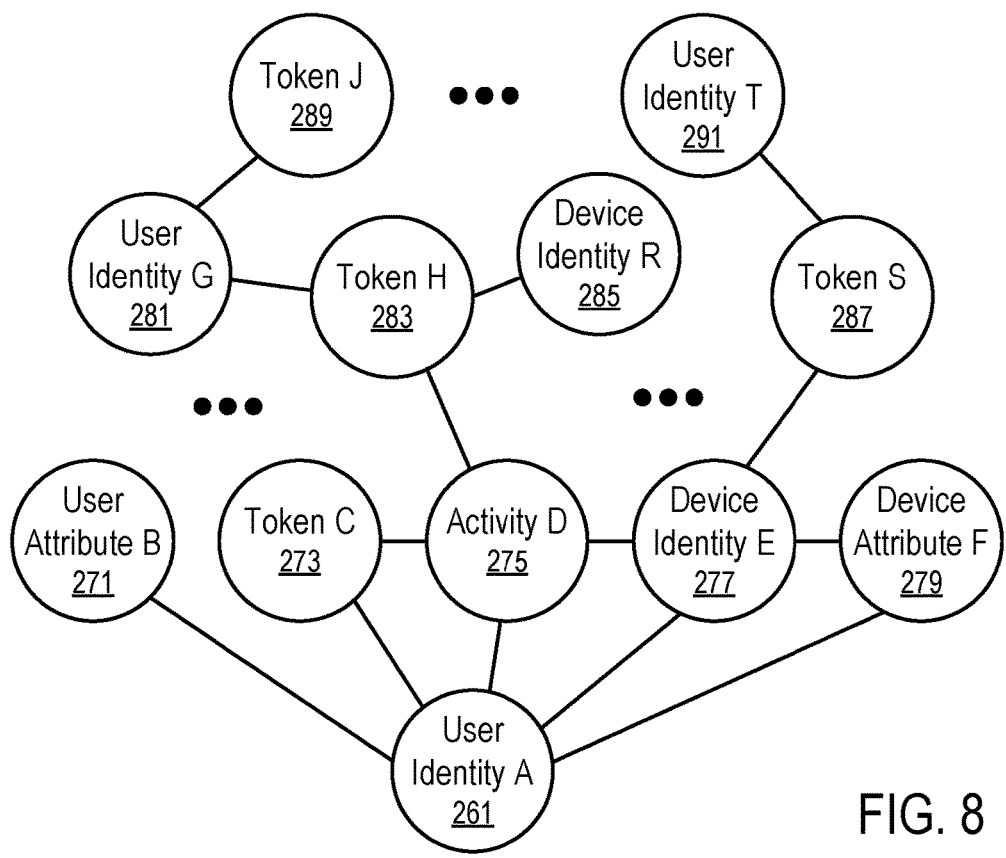
FIG. 8 illustrates a portion of a relation graph connecting different entities and attributes according to one embodiment.

FIG. 8 illustrates a portion of a relation graph connecting different entities and attributes according to one embodiment.

In FIG. 8, a user identity (261) in the graph is, for example, connected directly to a user attribute (271), a token (273) used in an activity (275) on a device having the device identity (277), where the device has the attribute (279).

In FIG. 8, an activity (275), for example, involves two access tokens (273 and 283) (e.g., for an interaction, exchange, or transaction between two persons); and thus, the activity (275) connects to both tokens (273 and 283).

In FIG. 8, the token (283) is, for example, used by a user identity (281) (e.g., in an activity that may be different from the activity (275)), which uses a further token (289) in a further activity.

In FIG. 8, the token (283) is used in the context of a device identity (285) and thus links the user identity (281) to the device identity (285).

In FIG. 8, since the token (287) used by the user identity (291) is submitted from a device having the device entity (277), the token (287) connects the device entity (277) to the use identity (297).

Thus, FIG. 8 illustrates examples of growing the relation graph based on aggregating contextual data from different access instances made using various devices by various persons. However, the relation graph is not limited to the examples discussed above and/or the specific connections illustrated in FIG. 8.

After the relation graph (239) is established, a portion of a graph (e.g., a graphlet) can be extract from the graph for the analysis of an access request. For example, a graphlet for the activity (275) can be extract by retrieving elements connected to the activity (275) up to a predetermined number of degrees of separate in the graph, as illustrated in FIG. 9.

Figure 9:
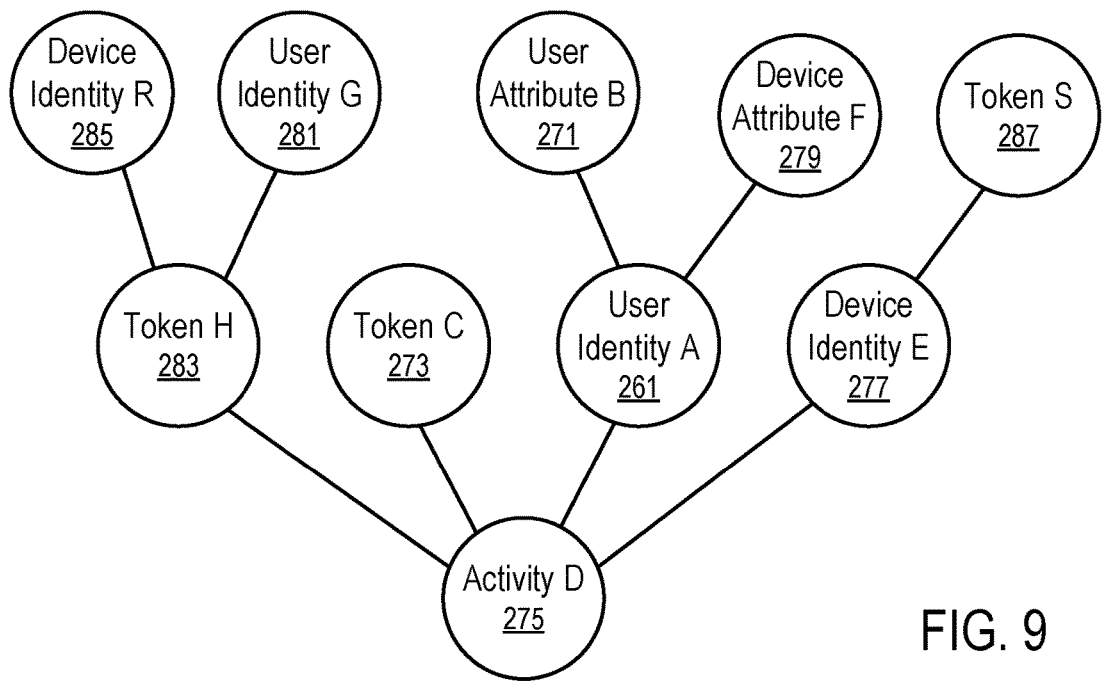
FIG. 9 illustrates a portion of a relation graph related to an activity according to one embodiment.

FIG. 9 illustrates a portion of a relation graph related to an activity according to one embodiment.

For example, in FIG. 8, the activity (275) is directed connected to the tokens (283 and 273), the user identity (261) and the device identity (277). Thus, the tokens (283 and 273), the user identity (261) and the device identity (277) are retrieved as the connected elements of the first degree in the graphlet illustrated in FIG. 9.

In FIG. 8, the device identity (285) and the user identity (281) are connected to the token (283). Thus, the device identity (285) and the user identity (281) are retrieved as the connected elements of the second degree to the activity (275) via the token (283) in the graphlet illustrated in FIG. 9.

Similarly, the user attribute (271) and the device attribute (279) are connected as second degree elements to the activity (275) via the user identity (261); and the token (287) is connected as a second degree elements connected to the activity (275) via the user identity (261).

In FIG. 9, the graphlet is retrieved in the form of a tree rooted at the activity (275); and the connections between any elements having the same degree of connections to the root (e.g., the connection between the token (273) and the user identity (261) as illustrated in FIG. 8) is discard. Alternatively, such connections may also be imported into the graphlet for the activity (275) for further analysis.

In FIG. 9, the level of connected elements (e.g., breadth or depth) retrieved from the graph for the graphlet is determined by the threshold degree of separate in the graph between the root element (e.g., activity (275)) and the retrieved elements. The minimum number of direct connections required from a path from an element to another is the degree of separation of the two elements in the graph. In FIG. 9, the elements up to a predetermined number of degrees of separation (e.g., two) are retrieved and organized in a form of a tree rooted at the activity (275). The predetermined number of degrees of separation can be increased to increase the breadth or depth of the extraction of the graphlet.

In some instances, the risk of the rooted element (e.g., activity (275)) is evaluated based on the risks of the elements in the extracted graphlet and/or their degrees of separates to the rooted elements. For efficiency, a graphlet is initially extracted for analysis according to a first degree of separation. When the risk level determined from an analysis of the graphlet is within a predetermined range, the breadth of graphlet extraction is expanded/increased to a second degree of separation for a further, comprehensive analysis. The expansion can be repeated as necessary and/or useful.

FIGS. 8 and 9 illustrate the extraction of a graphlet rooted at an activity (275) according to a predetermined degree of separate in the relation graph (239). The extracted graphlet can be analyzed to determine risk associated with the rooted element (e.g., the activity (275)) based on risks associated with the elements in the extracted graphlet.

In general, the extraction of a graphlet can be rooted at other types of elements in the relation graph. For example, extracting a graphlet rooted at the user identity (189) can be performed for an analysis of risks associated with the user identity (189); an extracted graphlet rooted at the device identity (185) can be used for an analysis of risks associated with the device identity (185); and an extracted graphlet rooted at the access token (141) can be used for an analysis of risks associated with the access token (141).

Further, in some instances certain types of elements can be eliminated by directly connecting elements that are initially connected by the elements of the types to be eliminated. A replacement connection can be used to replace two connections from an eliminated element to two previously indirectly connected elements; and the replacement can be optionally assigned a connection strength indicator reflecting the strength of the two replaced connections made via the eliminated element. For example, all elements other than user identities may be eliminated to generate a reduced graph that connects only user identities with connections having connection strength indicators indicating user identities directed connected with each other in the reduced graph. For example, a reduced graph can be generated to have only user identities, device identities, and access tokens. For example, another reduced graph can be generated to have only user identities, and device identities (or access tokens). For example, a further reduced graph can be generated to have only device identities and access tokens.

Figure 10:
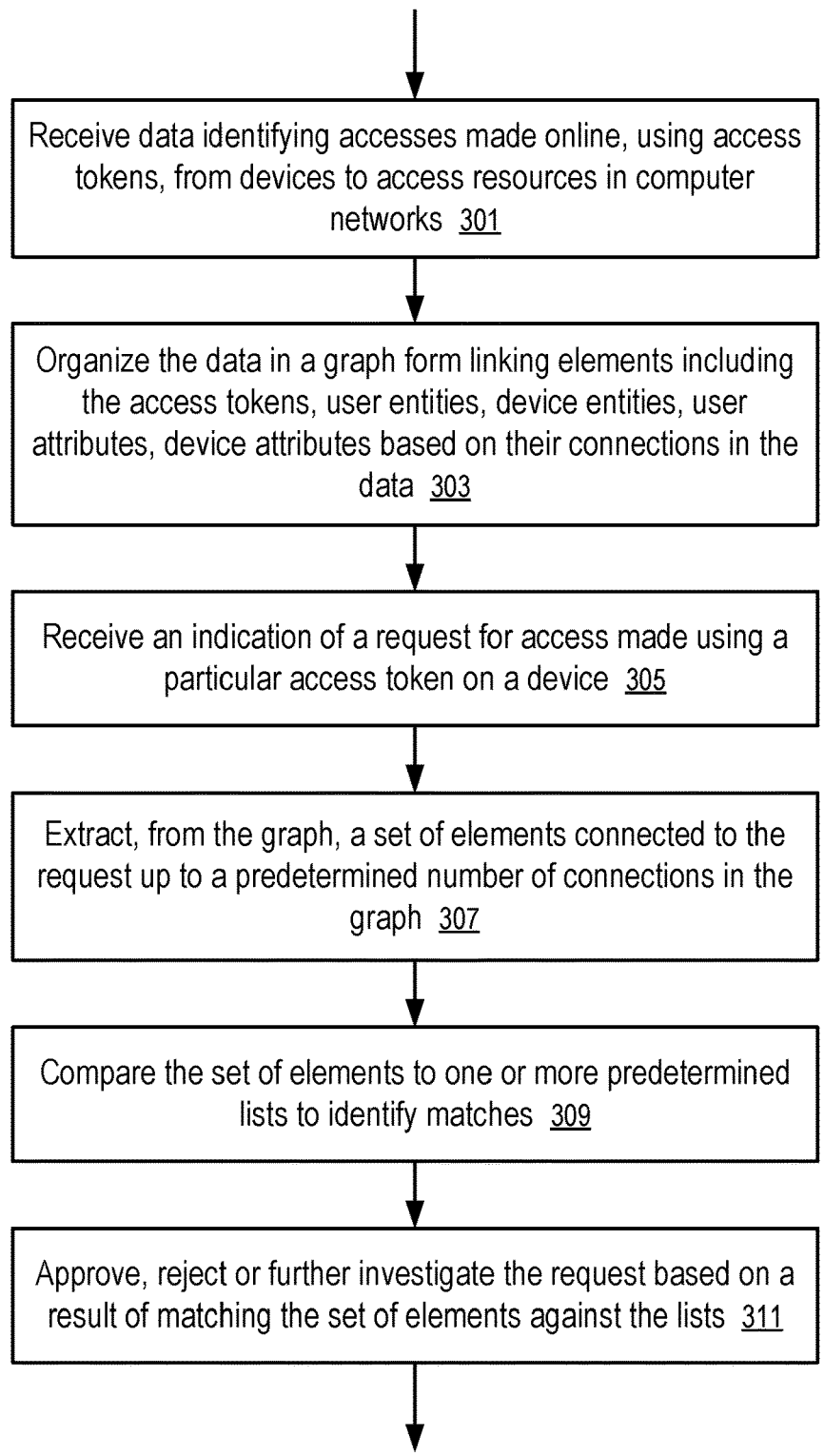
FIG. 10 shows a method for access control based on elements in a portion of a relation graph extracted for an activity according to one embodiment.

FIG. 10 shows a method for access control based on elements in a portion of a relation graph extracted for an activity according to one embodiment. For example, the method of FIG. 10 can be implemented in a controller (101) of FIG. 4 in a system illustrated in FIG. 1; the relation graph can be constructed in a way as illustrate in FIGS. 6, 7 and 8; and the portion can be extracted for an activity in a way as illustrated in FIGS. 8 and 9.

In FIG. 10, the controller (101) is configured to receive (301) data identifying accesses made online, using access tokens (e.g., 141, 221, . . . , 223), from devices (122, 123, . . . , 125, . . . , 129) to access resources in computer networks (e.g., 231, 233, 235). The received data may include activity records (171, 225, 227, 229) of the access activities and/or contextual data associated with the activities, such as device attributes (259) representing electronic signatures (187) of the respective devices (122, 123, . . . , 125, . . . , 129), and the user attributes (251) containing user information (150).

The controller (101) organizes (303) the data in a graph form linking elements including the access tokens (e.g., 141, 221, . . . , 223, 253, 273, 283, 287, 289), user entities (e.g., 189, 241, 261, 281, 291), device entities (e.g., 185, 257, 277, 285), user attributes (e.g., 150, 251, 271), device attributes (e.g., 187, 259, 279) based on their connections in the data, such as the relation graph (239) having portions illustrated in FIGS. 7, 8, and 9.

In response to receiving (305) an indication of a request for access made using a particular access token (273) on a device (e.g., 121, 123, . . . , 125, . . . , or 129), the controller (101) extracts (307), from the graph (e.g., 239), a set of elements connected to the request up to a predetermined number of connections in the graph (239). For example, after the contextual data of the request for access is added to the relation graph (239), the request for access corresponds to the activity (275) in FIG. 8; and a graphlet rooted in, or centered at, the activity (275) is extracted as in FIG. 9 up to a predetermined degree of separate in the relation graph (239).

The controller (101) compares (309) the set of elements (e.g., in the extracted graphlet illustrated in FIG. 9) to one or more predetermined lists (e.g., blacklists) to identify matches. Based on a result of matching the set of elements (e.g., the graphlet of FIG. 9) against the lists (e.g., blacklists (181)), the controller (101) approves, rejects, or further investigates (311) the request (e.g., represented by the activity (275)).

For example, the controller (101) counts the number of elements in the graphlet of FIG. 9 that are on a first list. If the count is above a first threshold, the controller (101) rejects the request (or further investigates the request).

If the count is less than the first threshold, the controller (101) counts the number of elements in the graphlet of FIG. 9 that are on a second list. If the counted element common to the second list and the graphlet is below a second threshold (which may or may not be the same as the first threshold), the controller approves the request; otherwise, the controller (101) rejects the request (or further investigates the request).

Other examples and details of the application of the technique that controls access based on comparing elements from a graphlet to one or more predetermine lists can be found in U.S. Pat. App. Pub. No. 2016/0071108, the entire disclosure of which is hereby incorporated herein by reference.

Figure 11:
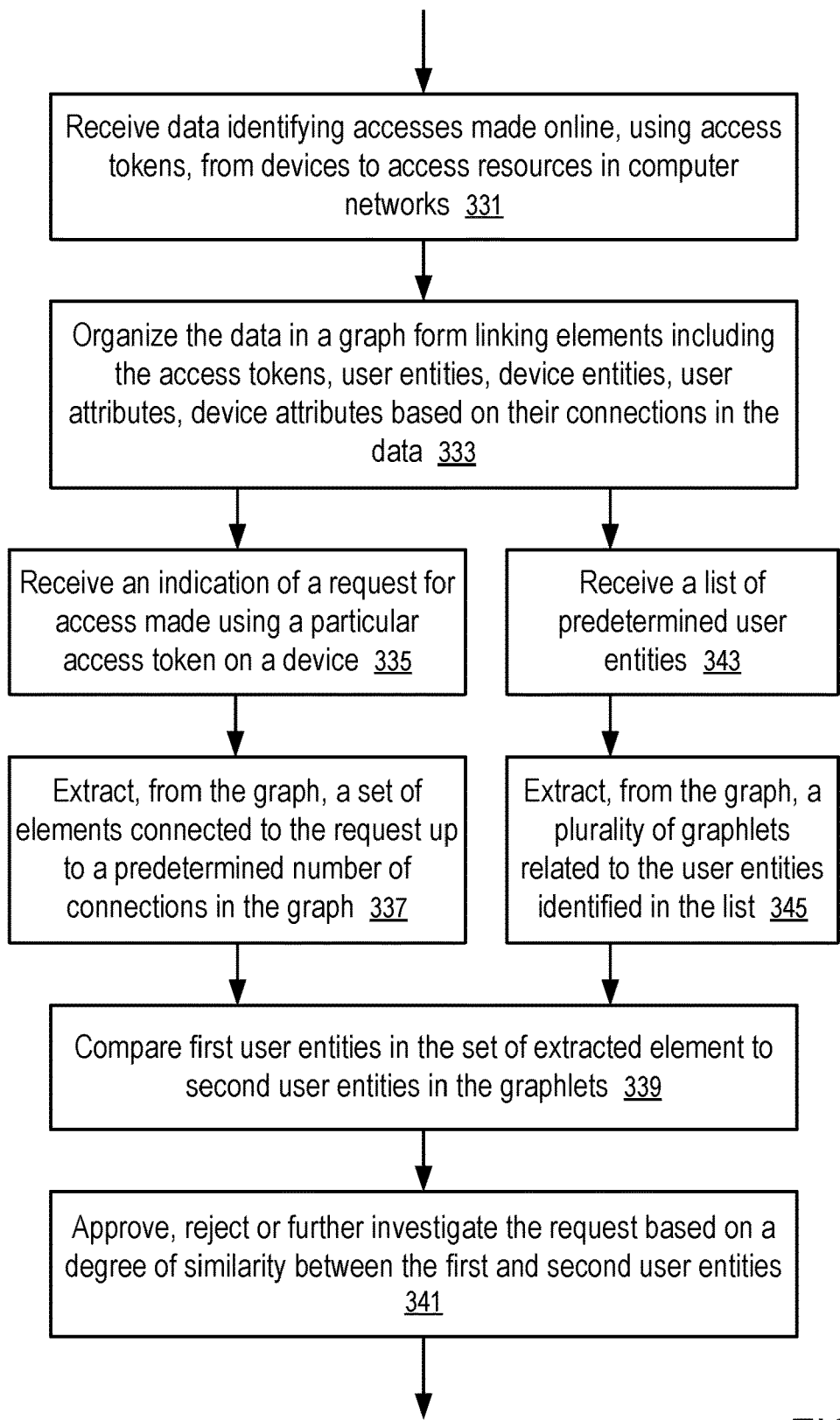
FIG. 11 shows a method for access control based on matching graphlets of a relation graph according to one embodiment.

FIG. 11 shows a method for access control based on matching graphlets of a relation graph according to one embodiment. For example, the method of FIG. 11 can be implemented in a controller (101) of FIG. 4 in a system illustrated in FIG. 1; the relation graph can be constructed in a way as illustrate in FIGS. 6, 7 and 8; and graphlets can be extracted for an activity in a way as illustrated in FIGS. 8 and 9.

In FIG. 11, the controller (101) is configured to receive (331) data identifying accesses made online, using access tokens (e.g., 141, 221, . . . , 223), from devices (122, 123, . . . , 125, . . . , 129) to access resources in computer networks (e.g., 231, 233, 235). The received data may include activity records (171, 225, 227, 229) of the access activities and/or contextual data associated with the activities, such as device attributes (259) representing electronic signatures (187) of the respective devices (122, 123, . . . , 125, . . . , 129), and the user attributes (251) containing user information (150).

The controller (101) organizes (333) the data in a graph form linking elements including the access tokens (e.g., 141, 221, . . . , 223, 253, 273, 283, 287, 289), user entities (e.g., 189, 241, 261, 281, 291), device entities (e.g., 185, 257, 277, 285), user attributes (e.g., 150, 251, 271), device attributes (e.g., 187, 259, 279) based on their connections in the data, such as the relation graph (239) having portions illustrated in FIGS. 7, 8, and 9.

After receiving (335) an indication of a request for access made using a particular access token (e.g., 141) on a device (e.g., 121, 123, . . . , 125, . . . , or 129), the controller (101) extracts (337), from the graph (239), a set of elements connected to the request up to a predetermined number of connections in the graph (239). For example, after the contextual data of the request for access is added to the relation graph (239), the request for access corresponds to the activity (275) in FIG. 8. A graphlet rooted in, or centered at, the activity (275) is extracted as in FIG. 9 up to a predetermined degree of separate in the relation graph (239). Alternatively, a graphlet rooted in the access token (273) used in the activity (275), or a graphlet rooted in the user identity (261) identified for the activity (275), or a graphlet rooted in the device identity (277) corresponding to a match to the electronic signature (187) for activity (275), can be extracted for the subsequent analysis.

In FIG. 11, the controller (101) also receives (343) a list of predetermined user entities. The controller (101) is configured to determine whether the user of the current request for access is sufficiently connected to any of the list of predetermined entities. To determine the relation of the user of the current request and the list of predetermined user entities, the controller (101) extract (345), from the graph (239), a plurality of graphlets related to the user entities identified in the list. For example, each of the extracted graphlets is rooted in one of the user entities in the list.

In FIG. 11, the controller (101) compares (339) first user entities in the set of extracted element (e.g., the graphlet extracted for the current activity (275), or the device entity (277) or the user identity (261) in the current activity (275)) to second user entities in the graphlets extracted for the listed of predetermined user entities.

Based on a degree of similarity between the first and second user entities, the controller (101) approves, rejects or further investigates (341) the current request. For example, when a degree of similarity of the entities in the graphlet extracted for the current request (e.g., rooted in the user identity (261) of the current request, or the activity (275), or the token (273)) and the entities in the graphlet extracted for a user identity in the predetermined list is above or below a threshold, the controller (101) rejects or approves the current request.

The degree of similarity in entities in two graphlets can be measured in various ways. For example, the degree of similarity can be configured to be proportional to the count of entities common to the two graphlets. For example, the degree of similarity can be configured to be proportional to the count common connections between entities in the two graphlets. For example, the degree of similarity can be a function of a count of common entities and common connections in the graphlets.

Other examples and details of the application of the technique that controls access based on similarity in extracted graphlets can be found in U.S. patent application Ser. No. 14/938,593, filed Nov. 11, 2015, the entire disclosure of which is hereby incorporated herein by reference.

Figure 12:
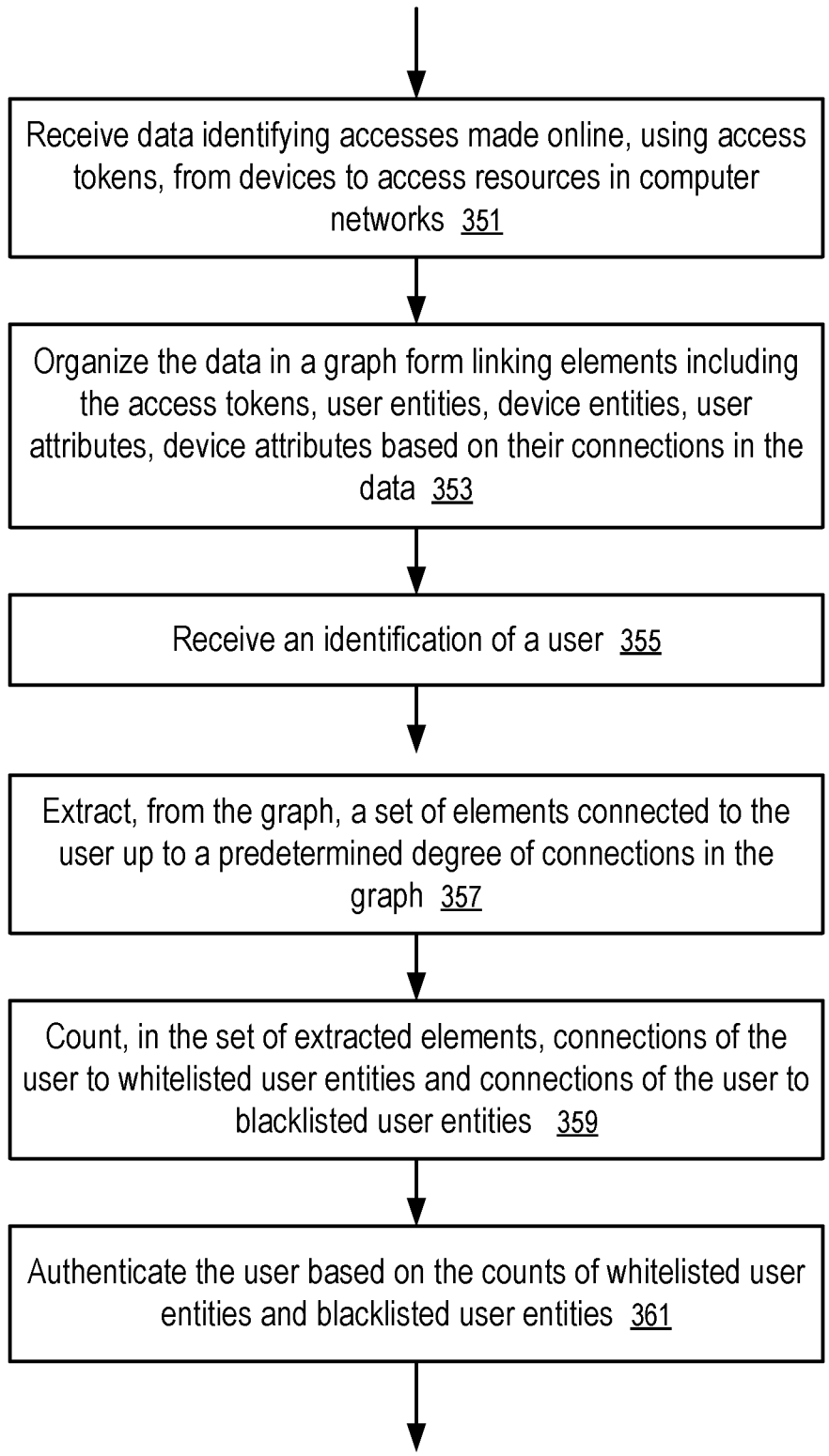
FIG. 12 shows a method for authenticating a user entity for access control based on matching graphlets of a relation graph according to one embodiment.

FIG. 12 shows a method for authenticating a user entity for access control based on matching graphlets of a relation graph according to one embodiment. For example, the method of FIG. 12 can be implemented in a controller (101) of FIG. 4 in a system illustrated in FIG. 1; the relation graph can be constructed in a way as illustrate in FIGS. 6, 7 and 8; and graphlets can be extracted for an activity in a way as illustrated in FIGS. 8 and 9.

In FIG. 12, the controller (101) is configured to receive (351) data identifying accesses made online, using access tokens (e.g., 141, 221, . . . , 223), from devices (122, 123, . . . , 125, . . . , 129) to access resources in computer networks (e.g., 231, 233, 235). The received data may include activity records (171, 225, 227, 229) of the access activities and/or contextual data associated with the activities, such as device attributes (259) representing electronic signatures (187) of the respective devices (122, 123, . . . , 125, . . . , 129), and the user attributes (251) containing user information (150).

The controller (101) organizes (353) the data in a graph form linking elements including the access tokens (e.g., 141, 221, . . . , 223, 253, 273, 283, 287, 289), user entities (e.g., 189, 241, 261, 281, 291), device entities (e.g., 185, 257, 277, 285), user attributes (e.g., 150, 251, 271), device attributes (e.g., 187, 259, 279) based on their connections in the data, such as the relation graph (239) having portions illustrated in FIGS. 7, 8, and 9.

In response to receiving (355) an identification of a user, the controller extracts (357), from the graph (239), a set of elements connected to the user up to a predetermined number of connections in the graph (239).

For example, when the identification of the user matches with the user identity (261) in the graph illustrated in FIG. 8, the controller (101) extracts a graphlet that is rooted at the user identify (261) and that has elements connected up to a predetermined number of degrees of separation from the user identity (261) in the graph illustrated in FIG. 8.

For example, when the identification of the user matches with the user identity (261) in the graph illustrated in FIG. 8, the controller (101) extracts an initial graphlet rooted at the user identify (261) and then extracts a resulting graphlet that elements have up to a predetermined number of degrees of separation from any of the elements in the initial graphlet (or any of the elements of a predetermined type in the initial graphlet).

In some instances, the resulting graphlet is extracted from a graph that is separate from the graph from which the initial graphlet is extracted. For example, the graph from which the initial graphlet is extracted is a built based on a first set of activity records; and the graph from which the resulting graphlet is extracted is built based on a second set of activity records related to a set of blacklisted identities. For example, the graph from which the resulting graphlet is extracted can be a graph reduced from the graph from which the initial graphlet is extracted, where the reduced graph is obtained by replacing indirect connections made via certain types of elements with direct connections (with indication of connection strength).

In FIG. 12, the controller (101) counts (359), in the set of extracted elements (e.g., a graphlet rooted at the user identity (261)), connections of the user to whitelisted user entities and connections of the user to blacklisted user entities. Based on the counts of whitelisted user entities and blacklisted user entities. the controller (101) authenticates (361) the user for access control.

For example, merchants and/or individuals involved with fraud typically try to create new identities rather quickly, to shake off known bad reputations. By discovering connections or relationships, or even multiplicities of entities, locations, or other objects and relationships or connections between new, apparently clean merchants, and existing ones, fraudulent activities on the merchants and/or individuals can be detected early on.

Other examples and details of the application of the technique that controls access based on the counts of connections to whitelisted user entities and/or blacklisted user entities can be found in U.S. patent application Ser. No. 14/949,305, filed Nov. 23, 2015, the entire disclosure of which is hereby incorporated herein by reference.

In one embodiment, the growth rate of a cluster of attributes in a relation graph related to an access token (e.g., a user account) is monitored for enhanced access control.

Figure 13:
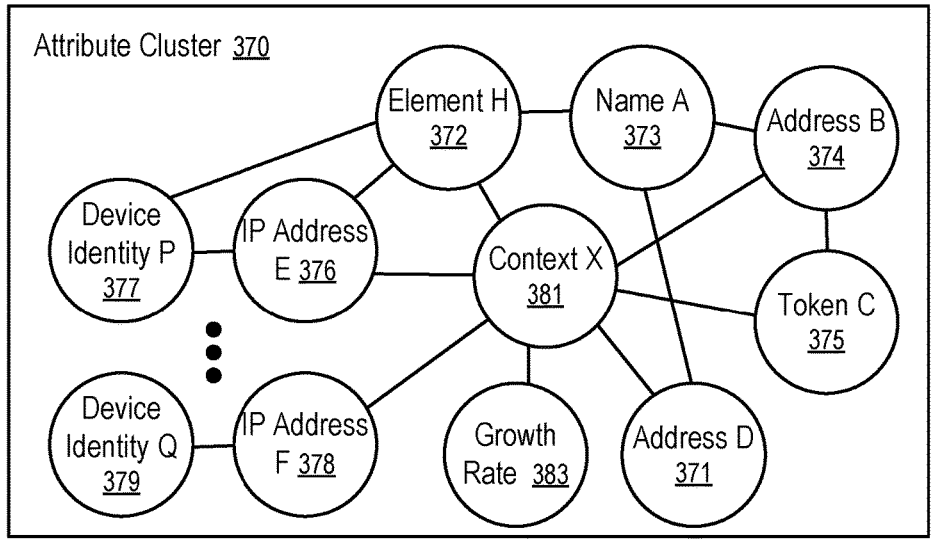
FIGS. 13 and 14 illustrate monitoring a growth rate of a cluster in a relation graph for access control according to one embodiment.
Figure 14:
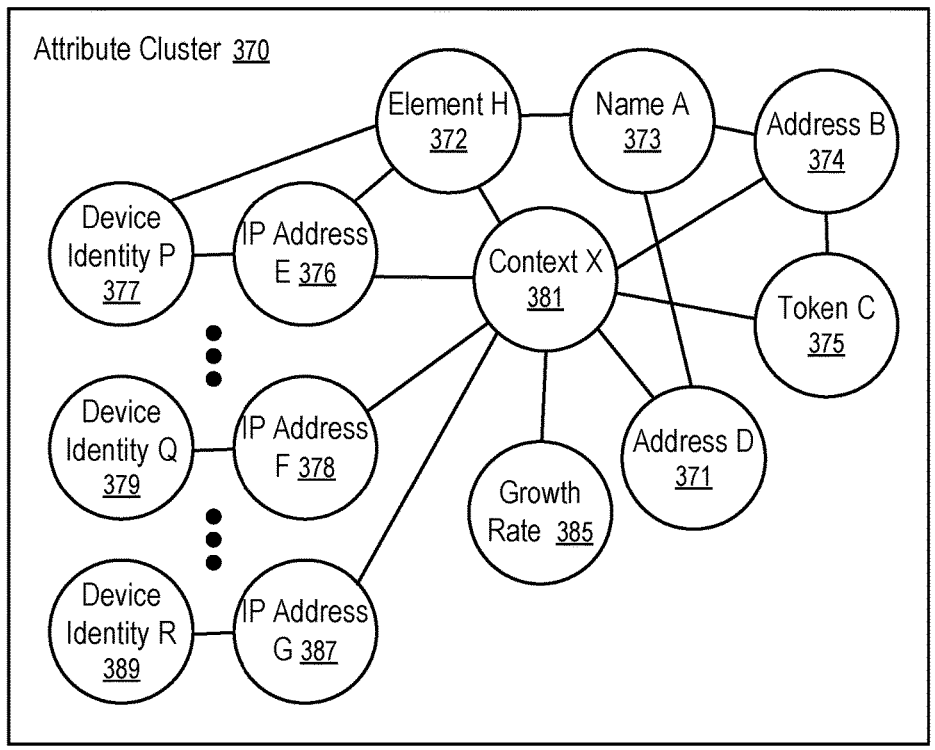

FIGS. 13 and 14 illustrate monitoring a growth rate of a cluster in a relation graph for access control according to one embodiment.

In FIG. 13, the attribute cluster (370) represents one of clusters of elements in a relation graph (239) stored in a database of the controller (101) (e.g., in the form of a database for big data).

In FIG. 13, the cluster (370) of elements is centered at an access token (375) associated with the access context (381). The cluster (370) contains elements (371-383), which are exemplary elements for a typical access token (e.g., a user account or a payment instrument). The actual number of elements may vary, depending on user activity, but they may typically include elements such as the main access token (375), user access context (381), user name (373), IP addresses (376, . . . , 378) with corresponding device entities (377, . . . , 379) from which accesses have been made using the access token (375) via the context (381), addresses (374 and 371) (e.g., shipping addresses, payment accesses, and payment addresses), payment tools, and other elements (e.g., 372).

For example, when multiple devices having the device identities (377, . . . , 379) at different IP addresses (376, . . . , 378) are used to gain accesses using the token (375), the size of the attribute cluster (370) grows.

In FIG. 13, the growth rate (383) tracks the rate of growth of the cluster (370). The controller (101) checks the cluster (370) to determine how many new elements, such as device identity (379) and the IP address (378), are added to the cluster (370) and at what rate; and if the rate is suddenly accelerating, it is an indication of fraud starting to happen. The controller (101) performs operations to control access to prevent fraudulent accesses.

FIG. 14 illustrates the state of the attribute cluster (370) after its growth following one or more access requests. In comparison with the state of the attribute cluster (370) illustrated in FIG. 13, the state of the attribute cluster (370) includes additional elements (e.g., 387, 389) (e.g., after additional accesses are made using device (389) from IP address (387) in a period of time. The addition of the elements change the growth rate (385) of the attribute cluster (370).

In a typical scenario of ID theft or fraudulent use of an access token (e.g., an payment account), a person trying to take over the access token performs activities that add to the attribute cluster (370) numerous devices (e.g., 379, . . . , 389) and IP addresses (378, . . . , 387) as part of the effort to take over the control of the access token, as well as, perhaps, some additional shipping addresses, all in very quick succession. This rapid addition of elements causes the rate (385) of growth or change of the cluster (370) to increase dramatically. The controller (101) monitors the change rate identified by the growth rate (385) of the cluster (370). A dramatic change/increase in the growth rate (385) can lead the controller (101) to flag the access token (375) for enhanced access control to delay and/or prevent fraudulent access.

There may be some legitimate situations, such as, for example, a person moving two or three times in quick succession, perhaps first in a temporary location and then again in to a more permanent location, that cause sudden growth in the change rate. In such cases, the controller (101)

is configured to verify the changes, and in the meantime, a temporary hold may be imposed. In some instances, manual verification of changes are performed as a result of the growth rate (385) exceeding a predetermined threshold.

Figure 15:
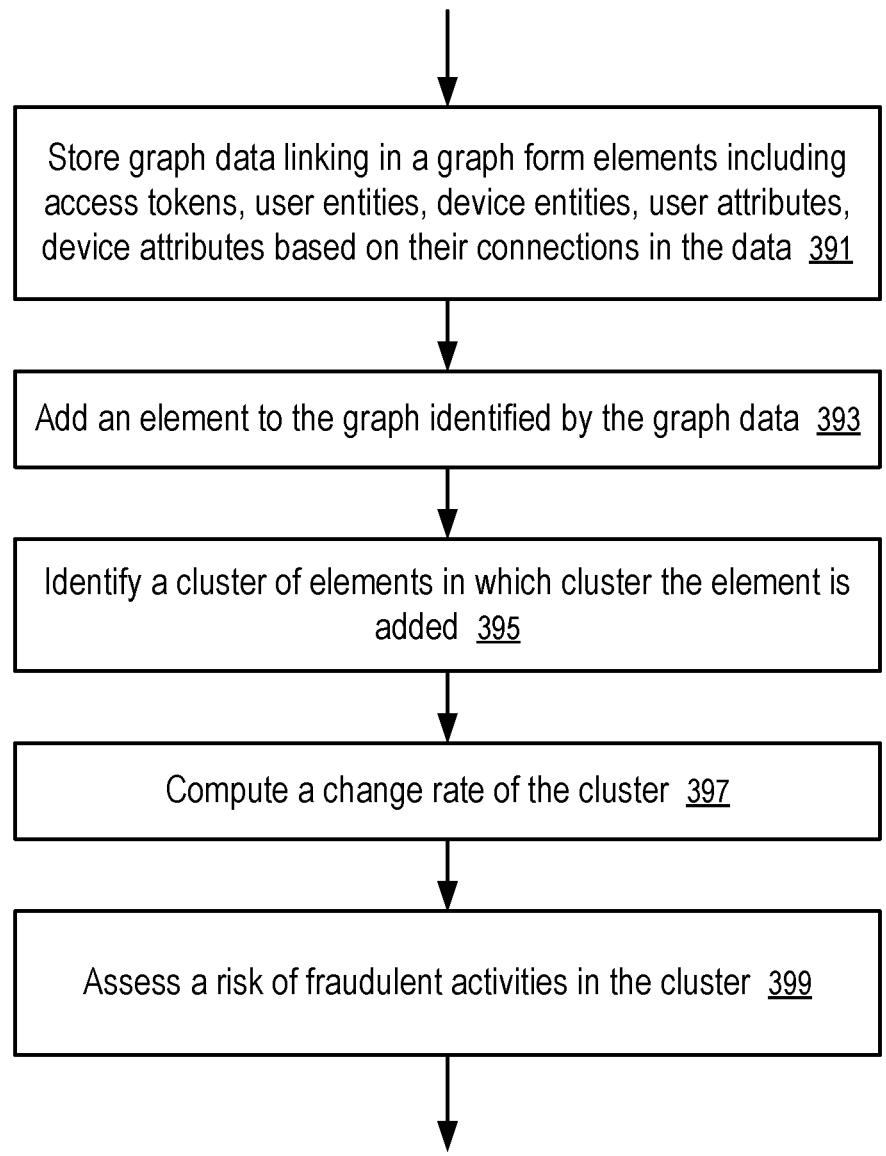
FIG. 15 shows a method for access control based on a growth rate of a cluster in a relation graph according to one embodiment.

FIG. 15 shows a method for access control based on a growth rate of a cluster in a relation graph according to one embodiment. For example, the method of FIG. 15 can be implemented in the system of FIG. 1 using the controller (101) of FIG. 4 based on the relation graph (239) illustrated in FIGS. 6-8. In some instances, the cluster is a graphlet extracted from the relation graph (239) based on a particular root element of an interest, such as an access token, a user identity, a device identity, an access context, such as electronic signature (187).

In FIG. 15, the controller (101) is configured to store (391) graph data linking, in a graph form (e.g., relation graph (239)), elements including access tokens, user entities, device entities, user attributes, device attributes based on their connections in the data. In response to adding (393) an element (e.g., 389) to the graph identified by the graph data, the controller (101) identifies (395) a cluster (e.g., 370) of elements (e.g., 371-379, 381) in which cluster the element is added. The cluster can be identified based on a statistical analysis of elements for a cluster of elements that are naturally close to each other in the relation graph (239), or based on the extraction of connected elements up to a predetermined degree of separation from an element of interest.

In response to addition of the element (389) to the cluster (370), the controller computes (397) a change rate or growth rate (385) of the cluster (370) and assesses (399) a risk of fraudulent activities in the cluster (370).

For example, the controller (101) can be configured to calculate and analyze the rate of change of elements in a user account, according to one aspect of the system and method disclosed herein. When a new item (e.g., 389 or 387) is added to the database that stores the elements related to the account of a user (e.g., 131), the addition of item (e.g., 389 or 387) causes the controller to recall/retrieve account data from the database (e.g., the attribute cluster (370) or a graphlet for the user account). The controller (101) retrieves in particular data about additions of items with associated time stamps and calculates the change rate of the data elements stored for the user account.

The change rate is calculated considering not only the total number of items stored in the database for the user account (e.g., the attribute cluster (370)), but also factors such as how often and how recently changes have been made, and the type of changes.

In computing the change rate, changes of different types and/or attributes can be provided with different weights. For example, the controller (101) rates changes to elements such as payment accounts and shipping addresses more heavily than, for example, it rates elements such as IP address, because it is quite normal for a user to change IP addresses often, but not necessarily shipping addresses. Accordingly, there is a whole range of additional factors entering into the calculation of change rates, such as new devices, IP addresses, shipping addresses, etc. that can indicate an onset of fraudulent access.

In some cases, for example including but not limited to, the addition of new payment and/or billing addresses could be an indicator of identity theft. In some cases, for example including but not limited to, new devices, IP or IP country, shipping addresses, phones, emails associated with an existing payment, etc. could be indication of payment fraud. Both sets need to be flagged and followed up with additional investigations appropriate for the potential transgression.

The controller (101) compares the change rate to a preset limit or limits. For example, the controller (101) may compare a single change rate that has weighted contribution from different types of data elements to a single limit to detect a possible onset of fraudulent access. Alternatively or in combination, the controller (101) may evaluate change rates corresponding to multiple facets of different types of changes on shipping addresses, IP addresses, devices, etc.

If the change rate is above a threshold (e.g., based on a single change rate, the composite rate of the change rates for different aspects, or any of the change rates relative to a respective limit), the controller (101) is triggered to add other considerations for access control. For example, the controller (101) may further consider factors, including but not limited to, reputation of user, reputation of entities being added to the relation graph/graphlet of the user, transaction velocity for entities involved, use of new or existing shipping address in transaction, absolute size of the user's graph, presence of other risk indicators within the transaction data (e.g., IP Geo-location to billing address distance, etc.). If, in view of the consideration of the additional factors, the risk of the user account is still above a limit, the controller (101) flags the user account, possibly suspends/limits further accesses/transactions within the user account until a review is performed, manually or automatically, depending on the situation. Other user authentication and access control methods, such as the access control performed based on a trust score discussed in connection with FIG. 5, the access control performed based on matching elements of a graphlet against predetermined lists of elements as discussed in connection with FIG. 10, the access control performed based on matching elements of a graphlet against predetermined lists of elements as discussed in connection with FIG. 10, the access control performed based on matching an extracted graphlet with graphlets extracted for a list of predetermined user entities as discussed in connection with FIG. 11, the access control performed based on counting connections in an graphlet to whitelisted and/or blacklisted user entities as discussed in connection with FIG. 12.

In one embodiment, the controller (101) is connected to an identity service to provide enhanced user authentication and access control in connection with and/or in combination with other user authentication and access control methods discussed herein.

Figure 16:
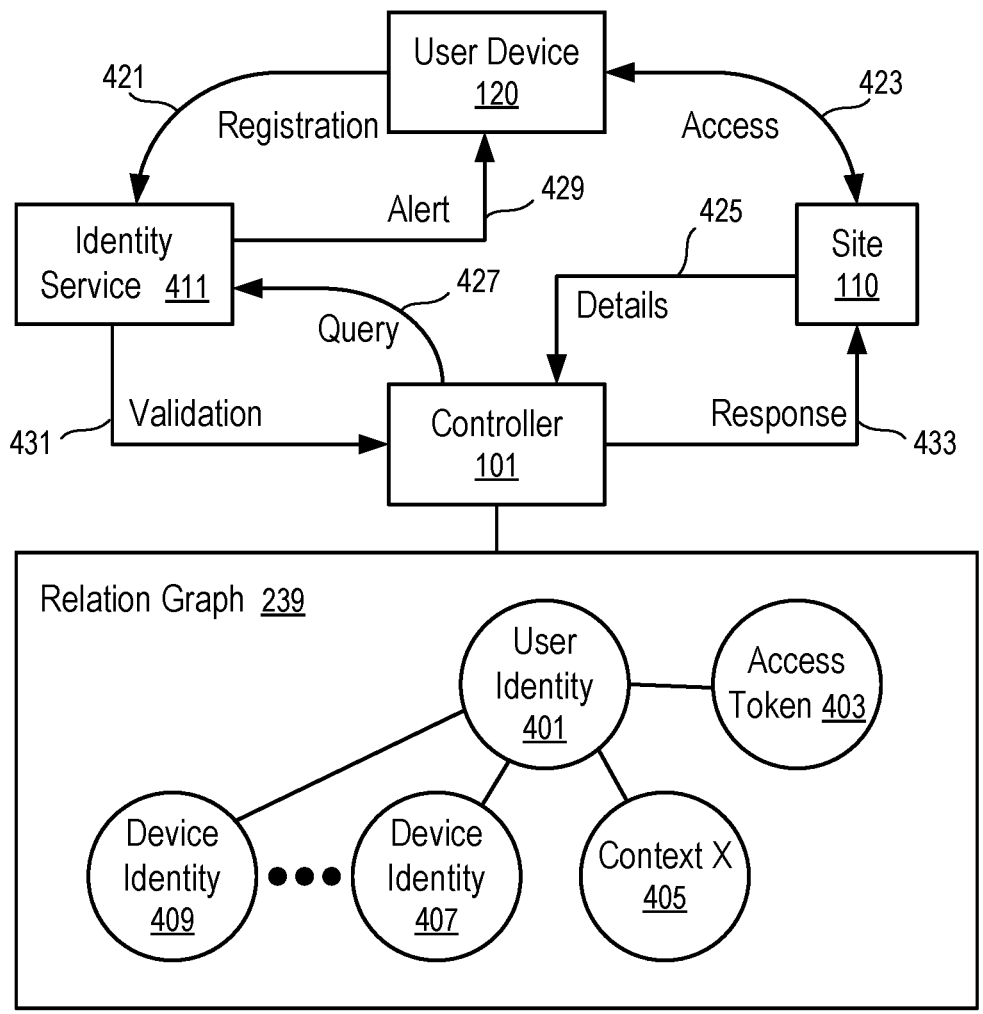
FIG. 16 illustrates a system for user authentication using an identity service according to one embodiment.

FIG. 16 illustrates a system for user authentication using an identity service according to one embodiment. For example, the system of FIG. 16 can be implemented in a controller (101) of FIG. 4 in combination with a system illustrated in FIG. 1.

In FIG. 16, an identity service (411) is configured to communicate with a user device (120) for identity protection. Based on a communication for registration (421), the identity service (411) stores data about a user (e.g., 131) of the user device (120) and provides the user device (120) with notices or alerts (429) of certain types of activities or events. The registration data associates information about user devices (e.g., corresponding to device identity in a relation graph (239)) with respective information about users of the user devices (e.g., corresponding to the user identities in the relation graph (239)). The identity service (411) may maintain a limited device to user association to facilitate push notifications to the user. The device to user association can also be obtained from the relation graph (239) via the controller (101).

Examples of such identity services are those offered for example but not exclusively by companies such as Experian, LifeLock and Equifax. Such services may be offered under many different brand names and with different target audiences and pricing schema, sometimes sold directly, sometimes offered through re-sellers, but essentially offering some kind of credit and identity theft monitoring as part of the credit bureaus business models.

In FIG. 16, when the user device (120) accesses (423) the computing site (110), the access may trigger a fraud check for user authentication and/or access control. For example, the user device (120) may access the computing site (110) using an access token to sign in the computing site (110), send a message to another user or make an exchange with another user via the computing site (110), or make a payment transaction with the merchant operating the computing site (110) using an account or a payment instrument.

The computing site (110) transmits to the controller (101) the details (425) related to the access that triggered the fraud check, such as transaction, email, payment, device, location, etc., as described above and throughout.

The controller (101) compiles into a relation graph (239) the data specifying the details (e.g., 425) associated with various accesses made by various user devices (e.g., 120) using access tokens (e.g., 141). The relation graph can be constructed in a way as illustrate in FIGS. 6, 7 and 8.

When the user device (120) uses the access token (403) to access (423) the computing site (110), the controller (101) mergers the details (425) received from the access (423) into the relation graph (239) and/or extract a graphlet based on the identification of the user identity (401) determined for the access (423), the device entity (407) determined for the access (423), or the access token (403) used in the access (423). The graphlet can be extracted in a way as illustrated in FIGS. 8 and 9.

In response to a determination that the details (425) add new elements and/or connections to the relation graph (239), the controller (101) reaches out via a query (427) to the identity service (411) (e.g., an ID protection service or an ID fraud protection services). Only one service (411) is shown in FIG. 16, for clarity and simplicity, but in general, more than one identity service can be used in the system in connection with the controller (101). The query (427) is configured for a confirmation of new details (425) in the access (423) being examined (e.g., an online activity, a login session, a transaction, messaging, trading).

Based on the registration data stored in the identity service (411), the identity service (411) provides the controller (101) with a validation (431) of the information provided in the query (427), which confirms one or more relations among data elements in the relation graph (239). Alternatively or in combination, the identity service (411) provides the information about user to device association to the controller (101) at the registration time to incorporate the association in the relation graph (239) and enable the validation to be performed by the controller (101) directly; and if the controller (101) identifies an element that is new to the relation graph (239), the query (427) causes the identity service (411) to generate an alert (429) to the user device (120) (since the identity service (411) typically has less information than the controller (101)). It is not required that the identity service (411) maintain its own set of associations.

For example, the validation (431) may indicates the ownership of an element (e.g., a device identity (409) of the device (120)) by a user identity (401), which causes the controller (239) to add to the portion of the graph (239) for the user the connection between the element (e.g., the device identity (409)) and the user identity (401). If the device identity (409) is known to the identity service (411) and/or associated with the user identity (401), the identity service (411) may not send an alert (429) to the registered user device (120). If the device identity (409) and/or its connection to the user identity (401) is new to the identity service (411), the identity service (411) provides an alert (429) to the user device (120) registered for association with the user identity (401) and/or to the controller (101).

In some cases, the access would be placed on hold until the user (e.g., 131) has confirmed the new details as being legitimate via the identity service (411) and/or the controller (101). For example, in response to the alert (429), the user (e.g., 131) may use the user device (120) to respond to the identity service (411), confirming the association of the device identity (409) corresponding to the user device (120) and the user identity (401) corresponding to the user (e.g., 131) who is using the access token (403). If the user (e.g., 131) confirms the device (120) to the identity service (411) as a legitimate device of the user (e.g., 131), the identity service (411) confirms the association to the controller (101) via the validation (431), and no further action is visible to the user (e.g., 131). Knowledge of the device (120) is added to the graph (239) in the form of elements (e.g., device identity (409) connected to the user identity (401)). The elements stored in the relation graph (239) according to the validation (431) may include validation details, such as the identification of the source of confirmation (e.g., an identifier of the identity service (411) that provides the validation (431)), the time/date stamp of the validation (431), and an confirmation ID, etc. The validation details can be stored as part of the element of the device identity (409) and/or its connection to the user identity (401) for future use as a legitimate device (120) of the user (131) using the access token (403).

Figure 17:
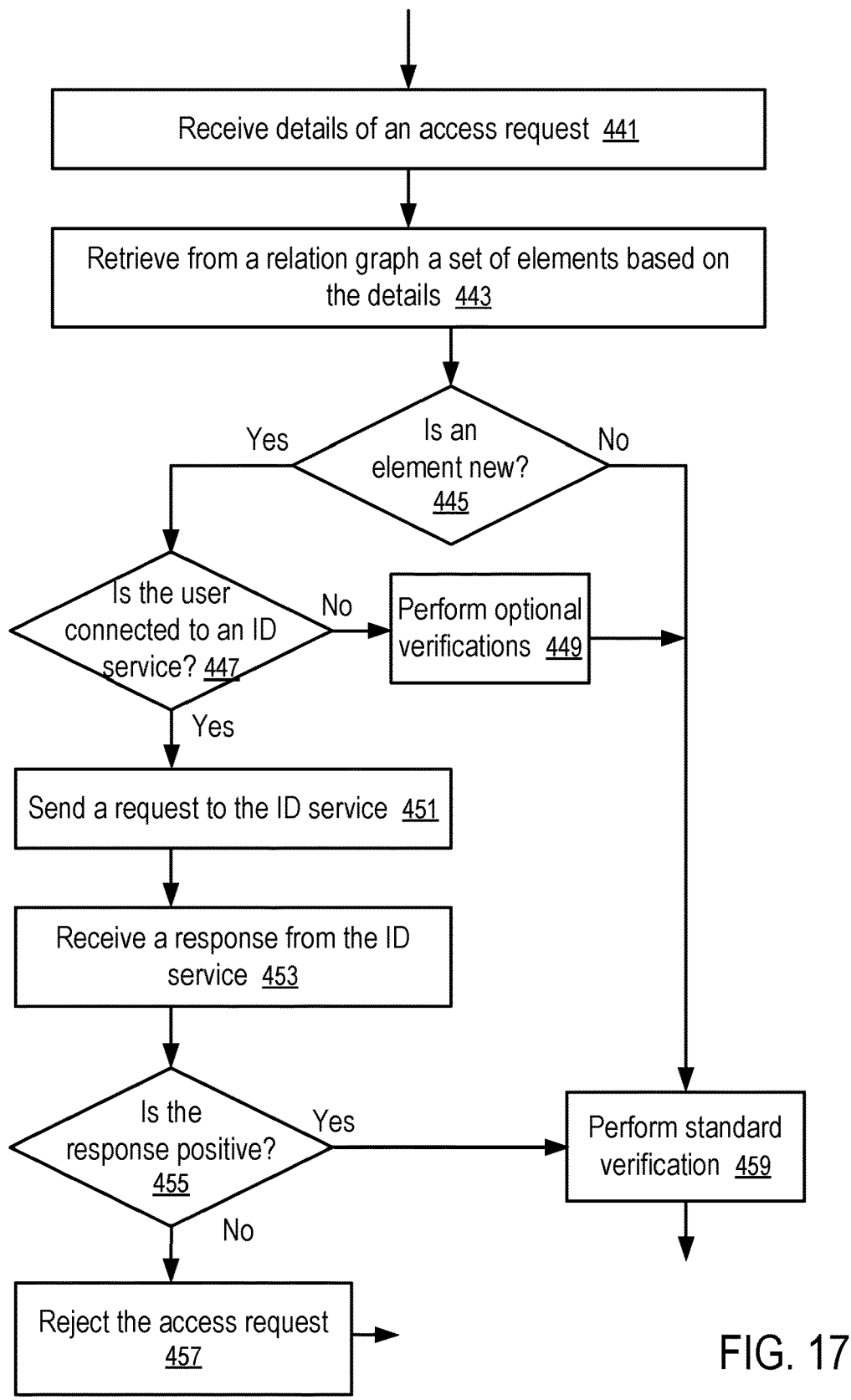
FIGS. 17 and 18 show methods for user authentication using an identity service according to one embodiment.
Figure 18:
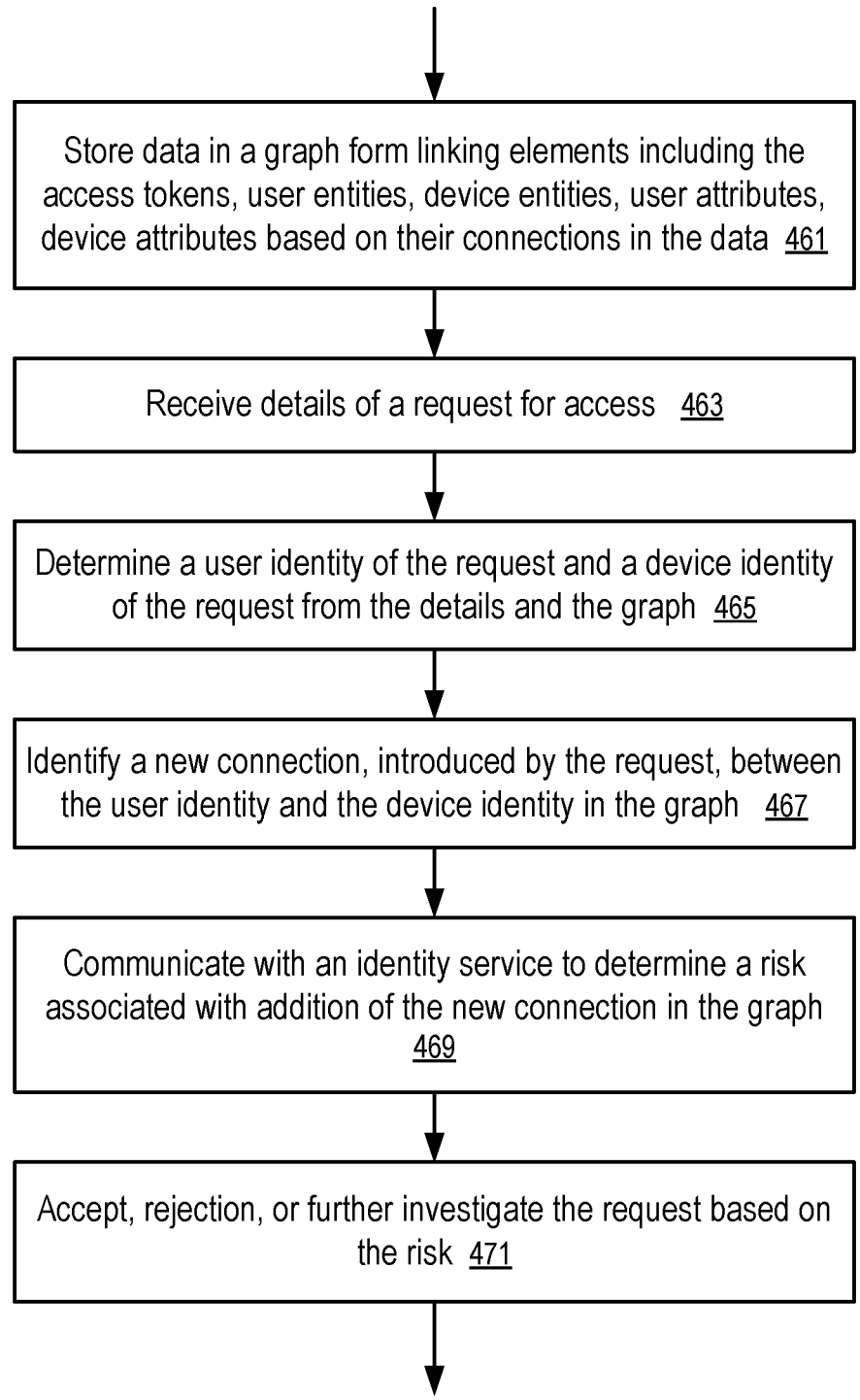

FIGS. 17 and 18 show methods for user authentication using an identity service according to one embodiment. For example, the methods of FIGS. 17 and 18 can be implemented using a system illustrated in FIG. 16.

In FIG. 17, a controller (101) is configured to authenticate a user in response to receiving (441) (e.g., from a computing site (110)) details of an access request (e.g., an access (423) made using an access token (403) on a user device (120)). For example, the access token (403) is associated in the relation graph (239) with the user identity (401); and based on the details (425), the controller (401) identifies the user identity (401) as a representation of the user who is making the access (423) using the device identity (409) representing the user device (120). When the details (425) of the access (423) creates a new connection between the device identity (409) and the user identity (401) in the relation graph (239), the new connection adds the device identity (409) as a new element to a graphlet rooted in the user identity (401) (or the access token (403)). For example, in response to the details (425) of the access (423), the controller (101) extracts a graphlet related to the access (423) (e.g., using the methods discussed in connection with FIGS. 8 and 9) and determine if any new elements is added in the graphlet by the details (425) of the access (423).

In FIG. 17, the controller (101) retrieves (443) from a relation graph (239) a set of elements based on the details (425) of the access (423) and determines (445) whether an element is new to the retrieved set of elements (e.g., being added to the set in view of the details (425) of the access (423)).

In FIG. 17, if an element is new, the controller (101) determines whether the user (e.g., as being represented by the user identity (401) in the retrieved set of elements)) is connected to an identity service (e.g., 411)). If the user determined (447) to be connected to an identity service (411), the controller (101) sends (451) a request to the identity service (411) that causes the identity service (411) to validate, against its stored registration data (if the identity service (411) maintains such registration data), a relation between the newly added element and the user (e.g., as being represented by the user identity (401) in the retrieved set of elements)). After the controller (101) receives (453) a response from the identity service (411), the controller determines (455) whether the response is positive (e.g., whether the association between the newly added element and the user identity (401) representing the user is confirmed via the registration data stored in the identity service (411), if such data exists). If the response is not positive (455), the controller (101) communicates with the computing site (110) to reject (457) the access request.

If the controller (101) determines (447) that the user is not connected to an identity service, the controller (101) may perform (449) optional verification operations for the association between the new element and the user.

In FIG. 17, the controller (101) performs (459) a standard verification (e.g., any of the other user authentication and/or access control method disclosed herein or another method known in the field), if no association of the elements with the user represents a risk of fraudulent access.

For example, the user authentication technique of FIG. 17 can be applied to fraud prevention in the use of a payment account. When a user starts with a new transaction with a merchant using a payment account, a new fraud check request comes in to the controller (101). The computer system of the merchant (e.g., the computing site (110)) sends the transaction details to the controller (101), which adds the details to its database and retrieves from the database matching key identity elements that form the relation graph (239) (or a graphlet extracted for the transaction, the user, and/or the payment account). The database of the controller (101) can be a classic database or a big data database. The controller (101) checks to determine if the transaction presents any new elements, such as a new device, or anything else that is hitherto unknown, or known but not previously associated with the other data elements of the transaction or any of the entities involved. If the transaction adds no new element to the retrieved set of elements, the controller (101) proceeds with a standard verification. If everything checks out OK, the controller (101) confirms the user authentication for the transaction and sends a confirmation response (433) to the computer system of the merchant (e.g., computing site (110)). If the controller (101) cannot confirm the transaction, the controller may send an abort message to the computer system of the merchant.

If the controller (101) identifies one or more new elements that are added to the retrieved set of elements by the transaction, the controller (101) checks to determine whether the identification of the user has any connection to a known identity protection service; and if so, the controller (101) contacts the corresponding identity protection service (e.g., 411) and sends a request to the identity protection service for confirmation of any new element(s) of the user, such as, for example, a new device (120). Although only one exemplary identity service (411) is shown in FIG. 16, for clarity and simplicity, there may be a multitude of different services. Other requests, in addition to requests for confirmation of new devices, may include, but are not limited to, confirming new addresses, new payment accounts, emails, phone numbers, ESNs, IMEIs, SSN, TINs, SIM, etc. as well as confirming transactions that are above a certain amount threshold, confirming money transfers that are going to foreign countries, or countries with which the user has not previously transacted with or otherwise suspect.

The identity protection service (e.g., 411) may have its own computer-implemented procedures, such as communication with the user at the user device (120) (or another device) directly or via email, SMS, automated phone call, etc. The user may expect some interaction with the identity protection service but may not expect to be contacted by a merchant fraud protection service. Once the identity protection service completes it identity verification (e.g., based on its registration data and/or communication with the user), it responds back to the controller (101) via a communication channel for the validation (431). In response, the controller (101) checks to determine whether the response is positive, that is, the user data can be verified. If not, the controller (101) goes into the abort procedure, sending an abort message to the computer system of the merchant over a communication connection. If the response is positive, the controller (101) moves to the standard verification procedure.

In FIG. 18, the controller (101) is configured to: store (461) data in a graph form linking elements including the access tokens, user entities, device entities, user attributes, device attributes based on their connections in the data; receive (463) details (425) of a request for access (423); determine (465) a user identity (401) of the request and a device identity (409) of the request from the details (425) and the graph (239); identify (467) a new connection, introduced by the request for access (423), between the user identity (401) and the device identity (409) in the graph (239); communicate (469) with an identity service (411) to determine a risk associated with addition of the new connection in the graph (239); and accept, (471) rejection, or further investigate the request based on the risk.

In one embodiment, the controller (101) for user authentication and access control includes: at least one microprocessor (145); memory (160) coupled with the at least one microprocessor (145); and a network interface (143) controlled by the at least one microprocessor (145) to communicate over a computer network (100) with: at least one computing site (110), and at least one identity service (411). The identity service (411) is a computing facility that can be implemented using one or more computers. The identity service (411) stores identification information of a user (e.g., 131) and is configured to communicate with a registered device (e.g., 120) of the user for identity protection.

The memory (160) of the controller (101) stores graph data representing a graph having: nodes representing data elements associated with accesses made using an access token (403), and links among the nodes representing connections between the data elements identified in detail data of the accesses, such as a graph (239) illustrated in FIG. 16.

The memory (160) of the controller (101) stores instructions which, when executed by the at least one microprocessor (145), cause the controller (101) to: receive, from the computing site (110), input data specifying details (425) of an access (423) made using the access token (403); and determine, from the input data: a device identity (409) representing a user device (120) from which the access (423) is made using the access token (403), and a user identity (401) representing the user (e.g., 131) who the access token (403) to make the access (423) from the user device (120).

The controller (101) updates the graph (239) according to the input data, identifies, in the graph (239), a new connection resulting from updating the graph (239) according to the input data, and transmits a query (427) over the network (100) to the identity service (411). The query (427) causes the identity service (411) to verify association of data elements corresponding to the new connection identified in the graph (239).

After receiving, over the network (100) and from the identity service (411), a validation (431) responsive to the query (427), the controller processes the access (423), made using the access token (403), based on the validation received from the identity service (411).

For example, in response to the query (427), the identity service (411) determines whether the association of the data elements corresponding to the new connection identified in the graph (239) is confirmed by the identification information stored in the identity service (411) (e.g., stored as part of a registration (421) and/or subsequent communications). In response to a determination that the association of the data elements cannot be confirmed by the identification information (e.g., registration data), the identity service (411) transmits an alert (429) to the registered device (e.g., 120) of the user or to the user's registered email or SMS to a registered phone, etc.; and the validation (431) is transmitted from the identity service (411) to the controller (101) in response to a reply to the alert (429). The reply may include data of registration (421) to confirm the association, or a rejection of the association (e.g., when the access is fraudulent).

In response to a determination that the identity service (411) cannot confirm the association of the data elements corresponding to the new connection identified in the graph (239) (e.g., even after the alert (429) and its associated reply or, in some instances, without waiting for the reply to the alert (429)), the controller (101) communicates with the computing site (423) to block the access (423) in some situations.

An example of the new connection identified in the graph is a new connection between a node representing the device identity (409) and a node representing the user identity (401). Another example of the new connection identified in the graph is a new connection between a node representing the device identity (409) and the node representing the access token (403). The association of the data elements corresponding to the new connection identified in the graph to be confirmed by the identity service (411) may include the association of attributes of the device identity (409) and the user identity (401), the association of attributes of the device identity (409) and the access token (403), and/or the association of attributes of the access token (403) and the user identity (401)

The user identity (401) can be determined according to the input data based on its previous establish connection to the access token (403) used to make the access (423), some of the attributes of the device identity (409), and/or other data. In some instances, the controller (101) determines the user identity (401) based on an electronic signature (187) generated from the input data received from the computing site (110) for the user authentication and/or for the control of the access (423).

In some instances, when the association of the data elements corresponding to the new connection identified in the graph cannot be confirmed, the controller (101) flags the user identity (401) as an imposter candidate (e.g., for further analysis and/or future analysis of other access instances).

The graph (239) can be identified for the update based on the access token (403), the identified user identity (401) of the access (423), and/or the identified device identity (409) of the access. In some instances, the graph is generated based on a cluster of access activities after a cluster analysis is performed to identify the cluster from a large set of access activities. In some instances, the graph (239) is extracted from a larger graph generated from a large set of access activities, wherein the extraction is based on a node of interest selected according to the input data and a predetermined number of degrees of separation from the selected node (and/or other criteria).

In some instances, the controller (101) identifies the identity service (411) based on the user identity (401), the device identity (409), and/or the access token (403).

The controller (101) may optionally determine from the graph data a score representing a risk of the access being fraudulent and processes the access (423) made using the access token (403) based on the score.

In some instances, it is desirable to prevent certain users identified in a list and/or users who are in close relation with the users on the list from certain types of accesses.

For example, a list of persons may be identified as officially suspected, sanctioned or politically exposed persons (PEPs). Persons in relationships (PIRs) with the PEPs, as well as the PEPs, may have access restrictions. However, some of the persons may attempt to defeat the restriction by making fraudulent accesses.

In one embodiment, the controller (101) is configured to perform a cluster analysis of the data relating to the veracity and/or reality of PIRs for access control. If the controller (101) analyzes sanction information elements and detects introduction of new, suspicious or fake PIRs as a means of circumventing sanction screening, such a suspicious PIR then may be flagged for further investigation and/or access control. A flagged PIR cluster can be further reviewed, even if only one PIR within was originally flagged, and, based on a hit with a suspect entity, the breadth of the examined co-related items may be expanded by an additional number (e.g., by increasing the degrees of separate used to extract the items of a graphlet from a relation graph), and if that expansion results in exposure of one or more suspicious connections, a further expansion may increase the degree of relationships examined. The search of such information for the relation graph is not limited to the public Internet per se, but could include any and all accessible sources of data, including but not limited to other data bases, public or not, such as government databases, some publicly accessible private databases, credit reporting systems, dark web (for example, see web page at en.wikipedia.org/wiki/Dark_web), person information and registration systems, sanctioned persons systems, etc.

In some situations, officially suspected, sanctioned or politically exposed persons (PEPs) may resort to using fake identities to transact and receive payoffs, in order to hide the true aspect of the events. The controller (101) of one embodiment is configured to detect the use of such techniques or at least to flag the possible use of them, for fast and easy investigations.

In sanction screening, the controller (101) is configured to compare the user identities of individuals and business entities against available lists representing regulatory sanctions. Regulations governing detailed reviews, particularly reviews of financial situations and transactions may, in the cases of a truthful (accurate) match against such lists, prevent a regulated entity (typically a person or institution reviewing or asked to review a proposed transaction) from further analyzing a proposed transaction, and in some cases stop said proposed transaction.

In the present application, a transaction generally involves access to predetermined resources and does not necessarily include movement of money. For example, a "proposed transaction" can be an onboarding process (or a third-party review during such a process), say, for issuing a loan or a lease to an apartment, or opening some other kind of account or process. Not all lists that are part of sanctions imply denying accesses or services. In some instances, lists containing, for example, names of officially suspected, sanctioned or politically exposed persons (PEPs) imply that the reviewing entity needs to perform enhanced due diligence (EDD) on the individual or the business. But such EDD doesn't mean that the access must be denied.

Figure 19:
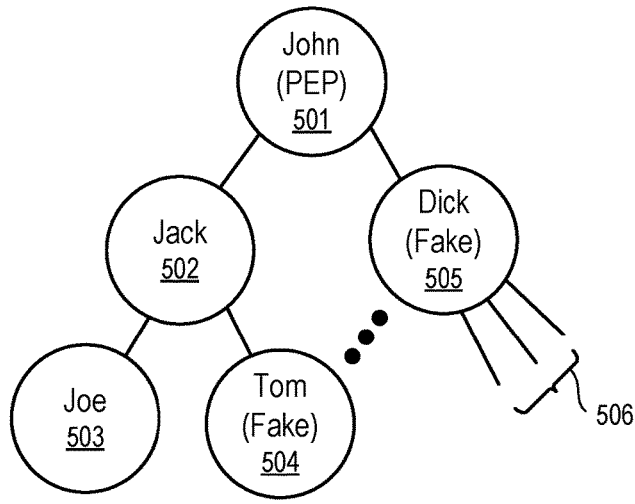
FIG. 19 illustrates an example of a network of related identities of one embodiment.

FIG. 19 shows an example of a network of related identities of one embodiment.

In the example of FIG. 19, the network of related user identities is rooted at a person named John (501) who is on a list of politically exposed persons (PEP). The network of related user identities can be extracted from a relation graph (239) using a technique discussed in connection with FIGS. 6-9. In some instances, the network of related user identities is identified based at least in part on a social networking site. In other instances, the network of related user identities is identified without using a social networking site.

In the example of FIG. 19, John (501) is connected to, for example, Jack (502), who is further connected to, for example, Tom (504), and Joe (503). Thus, the connected persons in the network can be considered as friends of John (501).

In a scenario, upon investigation, Tom (504) is shown to be a fake identity. Because Tom (504) is a fake identity, further investigation is called for, and it turns out that Dick (505) is also a fake identity, and all the names related to Dick in his network (506) are also fake identities. The discovery of these fake identities raises the suspicion that those people may have been used, for example, to launder money, or provide favors, or both, sent to John, and those activities have been used to hide real benefits that were given to John without declaring them properly.

Figure 20:
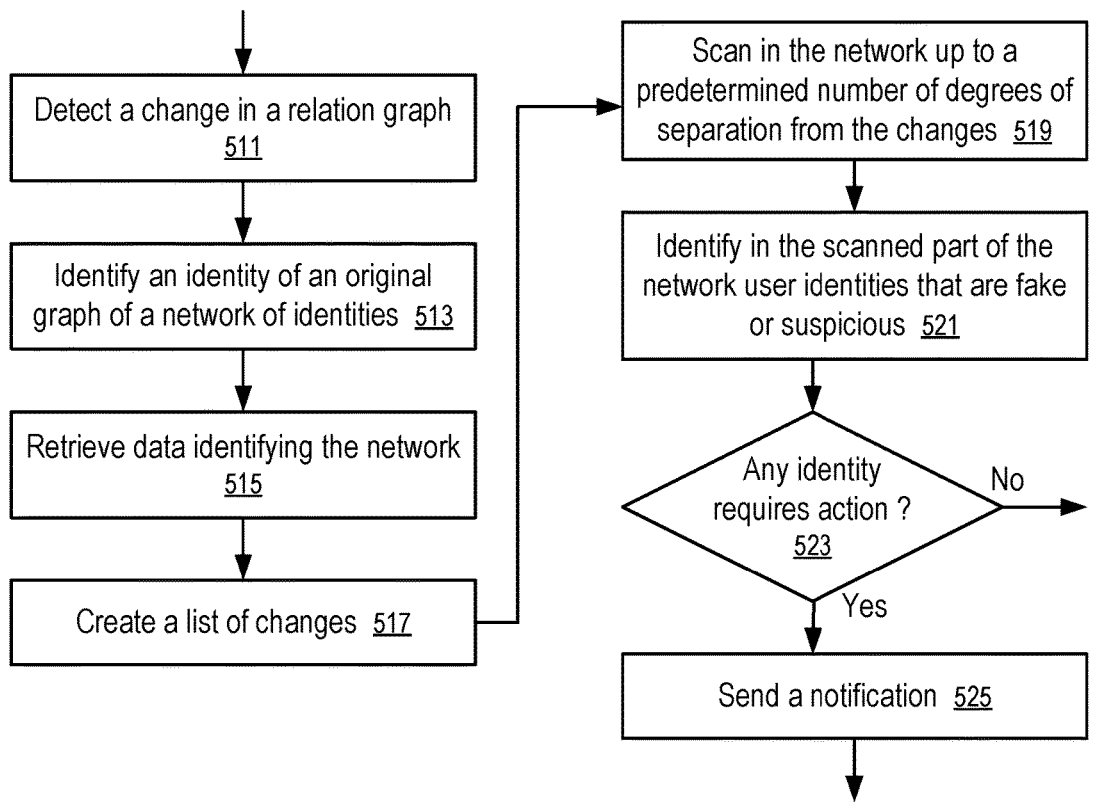
FIG. 20 shows a method of user authentication based on a network of identities according to one embodiment.

FIG. 20 shows a method of user authentication based on a network of identities according to one embodiment. For example, the method of FIG. 20 can be implemented in a controller (101) of FIG. 4 in a system of FIG. 1 using a relation graph (239) of FIG. 6 or FIG. 19.

In FIG. 20, the controller (101) is configured to investigate a network of identities, such as the network illustrated in FIG. 19. The detecting (511) of a change in the relationships illustrated in FIG. 19 causes the controller (101) to activate the investigation.

Typically, such a triggering change could include adding or removing network members, or a change in status of a person close to the person on the predetermined list (e.g., PEP John 501), such as the change of status of a person who is connected to the listed person (e.g., 501) with one or two degrees of separation in the network (e.g., having a first or second relationship to the PEP).

In FIG. 20, the controller (101) identifies an identity of an graph of a network original network (e.g., the user identity of John (501)) and retrieves (515), from the data storage unit of the controller (101), the network data identifying the network of user entities. Based on recent access activities, the controller (101) creates (517) a list of changes in the network.

For each of the changes, the controller (101) scans (519) in the network up to a predetermined number of degrees of separations. In the relation graph or user entity network as illustrated in FIG. 19, two persons are considered to have "n" degrees of separate when the minimum path between the two persons in the network has "n" direct connections. A scan of to the "n" degrees of separate identifies the user identities that are connected from a changed user identity not more than "n" degrees of separation; and the controller (101) identifies (521), in the scanned part of the network, user identities that are fake or suspicious. Suspicious or fake identities are flagged for follow-up The "n" can be modified to a greater or lesser degree, depending on jurisdiction, laws, the status of the PEP, and also whether problems have been previously identified with this network of user identities.

In FIG. 20, the controller (101) determines (523), based on a result of identifying the fake or suspicious entities in the network, determines whether any identities require action by some authority; and if so, the controller (101) sends (525) a notification to a predetermined person(s) or agency.

For example, the controller (101) collects sanction-related information from sources related to persons (or entities, as in juristic persons) in relationships (PIRs) with officially suspected, sanctioned or politically exposed persons (PEPs). The controller (101) performs a cluster analysis of additional data about the veracity and/or reality of PIRs. Thus, suspect persons and or other entities in the environment around PEPs (e.g., within a predetermined number of degrees of separation from the PEPs in a network of user identities) can be found and if necessary flagged for further examination. Further, if the controller (101) detects introduction of new, suspicious or fake PIRs as a means of circumventing sanction screening, such a suspicious PIR then may be flagged for further investigation. If any PIR in a cluster is flagged, the whole PIR cluster can be further reviewed, even if only one PIR within was originally flagged; and, based on a hit with a suspect entity, the breadth of the examined co-related items may be expanded by an additional number (e.g., the number of degrees of separate used to identified the environment can be increase for cluster expansion), and if that expansion results in exposure of one or more suspicious connections, a further expansion may increase the degree of relationships examined. The search of such information is not limited to the public Internet per se, but would include any and all accessible sources of data, including but not limited to other data bases, public or not, such as government databases, some publicly accessible private databases, credit reporting systems, dark web or similar (for example, see web page at en.wikipedia.org/wiki/Dark_web), person information and registration systems, officially suspected persons, sanctioned persons systems, etc.

Figure 21:
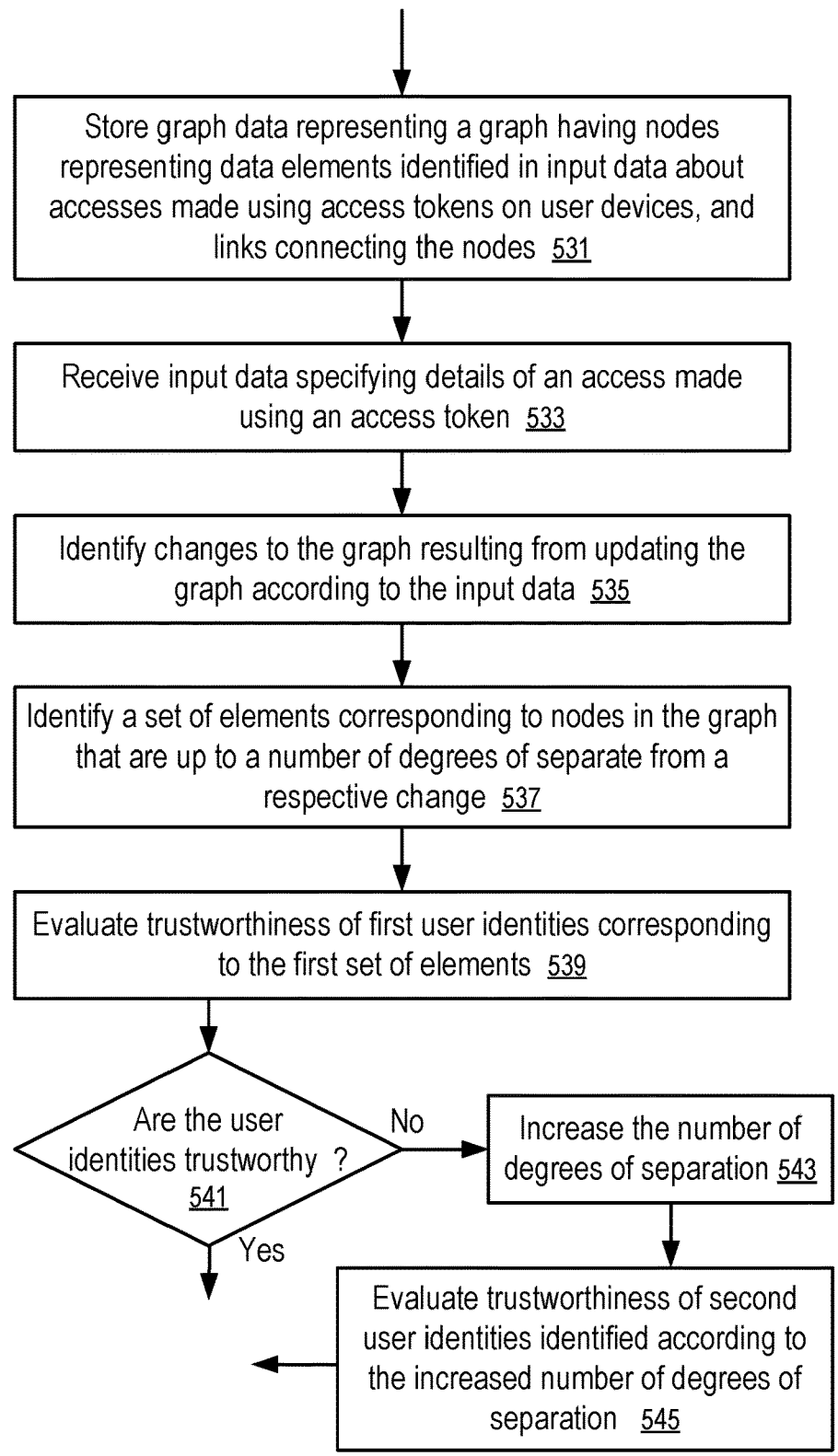
FIG. 21 shows a method to control access based on a network of identities according to one embodiment.

FIG. 21 shows a method to control access based on a network of identities according to one embodiment. For example, the method of FIG. 20 can be implemented in a controller (101) of FIG. 4 in a system of FIG. 1 using a relation graph (239) of FIG. 6 or FIG. 19.

In FIG. 21, the controller (101) is configured to store (531) graph data representing a graph having: nodes representing data elements identified in input data about accesses made using access tokens on user devices; and links connecting the nodes. In response to receiving (533) input data specifying details (425) of an access (423) made using an access token (403), the controller (101) identifies (535) changes to the graph (239), where the changes result from the updating of the graph (239) according to the input data.

For a given respective change, the controller (101) identifies (537) a set of elements corresponding to nodes in the graph (239) that are up to a number of degrees of separate from the respective change and evaluates (539) trustworthiness of first user identities corresponding to the first set of elements. for example, the controller (101) may reduce the graph (239) to a graph containing only user identities by replacing direct connections provided by other types of nodes with direction connections. Alternatively, the controller (101) may treat each node that is not a user identity as a part of a connection between user identities.

In FIG. 21, the controller (101) determines (541) whether the user identities identified from the change are trustworthy. For example, the controller (101) may change whether any of the user identities are on a list of fake user identities and/or suspicious user identities. For example, the controller (101) may count those of the user identities that are on a list of fake user identities and/or suspicious user identities and determine if the count is about a threshold.

If the user identities identified from the change are not trustworthy based on a predetermined criteria, the controller (101) increases (543) the number of degrees of separation to identify an expanded set of elements in a way similar to the operation (537) discussed above. The controller (101) then evaluates (545) trustworthiness of second user identities identified according to the increased number of degrees of separation.

When the trustworthiness of second user identities do not meet a requirement, the controller (101) may further increase (543) the number of degrees of separate for identifying related user identities, or reject, block, and/or flag the current access, the access token used in the current access, and/or the user identity for the user making the current access.

In some instances, the controller (101) also performs other checks, such as the growth rate (383), the trust score as discussed in FIG. 5, and/or query (427)/validation (431) with an identity service (411) of FIG. 16.

In one embodiment, the controller (101) for user authentication and access control has: at least one microprocessor (145); a network interface (143) controlled by the at least one microprocessor to communicate over a computer network (101) with at least one computing site (110); and memory (160) coupled with the at least one microprocessor (145) and storing graph data representing a graph having: nodes representing data elements associated with accesses made using access tokens, and links among the nodes representing connections between the data elements identified in collected data about the accesses. The memory (160) further stores instructions which, when executed by the at least one microprocessor (145), cause the controller to: receive, from the computing site (1010), input data specifying details (425) of an access (423) made using an access token (403); update the graph (239) according to the input data; and identify changes in the graph (239) resulting from updating the graph according to the input data.

For each respective change among the changes resulting from the updating of the graph, the controller (101) identifies a first set of elements corresponding to nodes in the graph that are up to a first predetermined number of degrees of separation from the respective change and evaluates trustworthiness of first user identities corresponding to the first set of elements to process the access (423) made using the access token (403) based on the trustworthiness of the first user identities corresponding to the first set of elements.

For example, the trustworthiness of the first user identities can be evaluated by comparing the first user identities to a list to determine whether any of the first user identities is on the list; and in response to a determination that at least one of the first user identities is on the list, the controller further identifies a second set of elements corresponding to nodes in the graph that are up to a second predetermined number of degrees of separation from the respective change. The second predetermined number of degrees of separation is larger than the first predetermined number of degrees of separation, and the second set of elements does not include any of the first set of elements. The controller (101) evaluates trustworthiness of second user identities corresponding to the second set of elements and processes the access made using the access token based at least in part on the trustworthiness of the second user identities corresponding to the second set of elements.

For example, the first user identities may be considered untrustworthy when one of the first user identities is on a list of fake user identities or a list of suspicious user identities.

For example, the first user identities may be considered untrustworthy when a count of user identities matching a sanction or PEP list is above a threshold.

In response to a determination that the trustworthiness of the first user identities does not meet a predetermined requirement, the controller (101) may: identify a second set of elements corresponding to nodes in the graph that are up to a second predetermined number of degrees of separation from the respective change, where the second predetermined number of degrees of separation is larger than the first predetermined number of degrees of separation; evaluate trustworthiness of second user identities corresponding to the second set of elements; and process the access made using the access token based at least in part on the trustworthiness of the second user identities corresponding to the second set of elements.

Based on the trustworthiness of the second user identities, the controller (101) may communicate with the computing site (110) to block the access (e.g., in response to a determination that a count of a subset of the second user identifies that fake and/or suspicious is above a threshold)

The graph (239) can be identified for the update based on the access token (403), the identified user identity (401) of the access (423), and/or the identified device identity (409) of the access. In some instances, the graph (239) is generated based on a cluster of access activities after a cluster analysis is performed to identify the cluster from a large set of access activities. In some instances, the graph (239) is extracted from a larger graph generated from a large set of access activities, wherein the extraction is based on a node of interest selected according to the input data and a predetermined number of degrees of separation from the selected node (and/or other criteria).

The controller (101) may optionally determine from the graph data a score representing a risk of the access being fraudulent and processes the access (423) made using the access token (403) based on the score.

For example, the controller (101) of one embodiment is configured to perform computerized fraud detection. After collecting contextual information and fraud information and analyzing new elements in a transaction request submitted from a merchant, the controller (101) identifies data related to any new element introduced by the transactor and contacts one or more ID fraud protection services to confirm the validity of the new element, such as the device of the transactor, the payment account used in the transaction, the shipping address requested for the transaction, the billing address identified for the transaction, an email address identified for the transaction, a phone number identified for the transaction, a national ID of the transactor, etc. Upon receiving a confirmation from an ID fraud protection service, the controller (101) adds the element to the transactor profile in the system. The ID fraud protection service may also notify the transactor of a new device never used before on his/her/its account; and additional queries from the fraud detection system may be passed through the ID fraud protection service to the transactor through its trusted communication channel.

In one embodiment, the controller (101) is configured to insert data elements in a relation graph configured to track the relations of elements observed in certain computerized accesses made using one or more access tokens. When a new element is inserted into the graph, the controller (101) computes a risk score based on a plurality of measurements of the graph. In response to the risk score being above a threshold, the controller (101) performs further operations to authenticate users and/or control access to prevent fraudulent access. Another example is the use of the risk score in the positive sense: if the score is below a second threshold then this can be taken as a strong indicator that the transaction is low risk and no further analysis is required.

Figure 22:
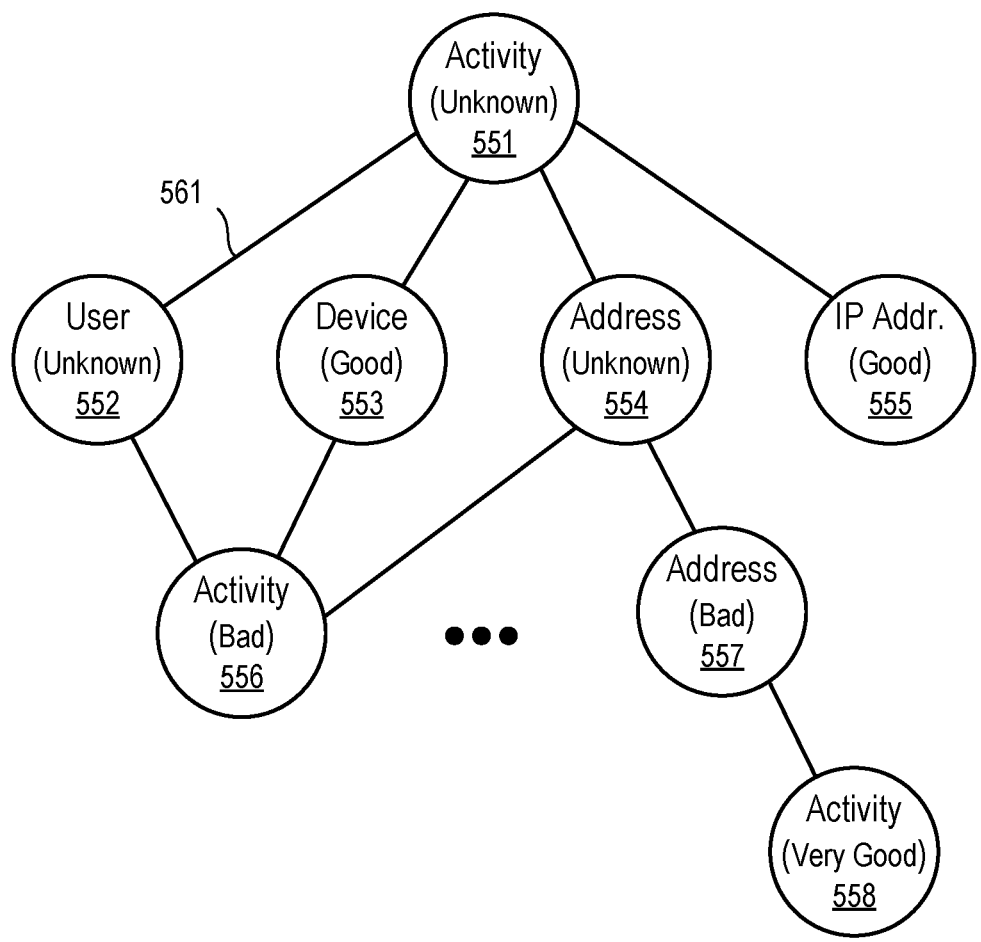
FIG. 22 illustrates an example of a graph of data elements related to access activities according to one embodiment.

FIG. 22 illustrates an example of a graph of data elements related to access activities according to one embodiment. For example, the graph of FIG. 22 can be generated based on activity records (225, 227, 229) collected from one or more of the networks (231, 233, 235) illustrated in FIG. 6. The collected information in the activity records (225, 227, 229) includes the identification of activities, the parameters of the activities, and the contextual information of the activities, such as the information of devices used to perform the activities, the network configuration of the devices at the time of the activities, etc.

The graph illustrated in FIG. 22 includes elements and connections linking the elements based on the observed relations of the elements in the activity records. Examples of types of elements illustrated in FIG. 22 includes activities, users (e.g., represented by user identities), devices (e.g., represented by device identities), user addresses, IP addresses, etc. In general, a relation graph (239) may also include other types of elements, such as access tokens, device attributes, user attributes, etc.

Figure 23:
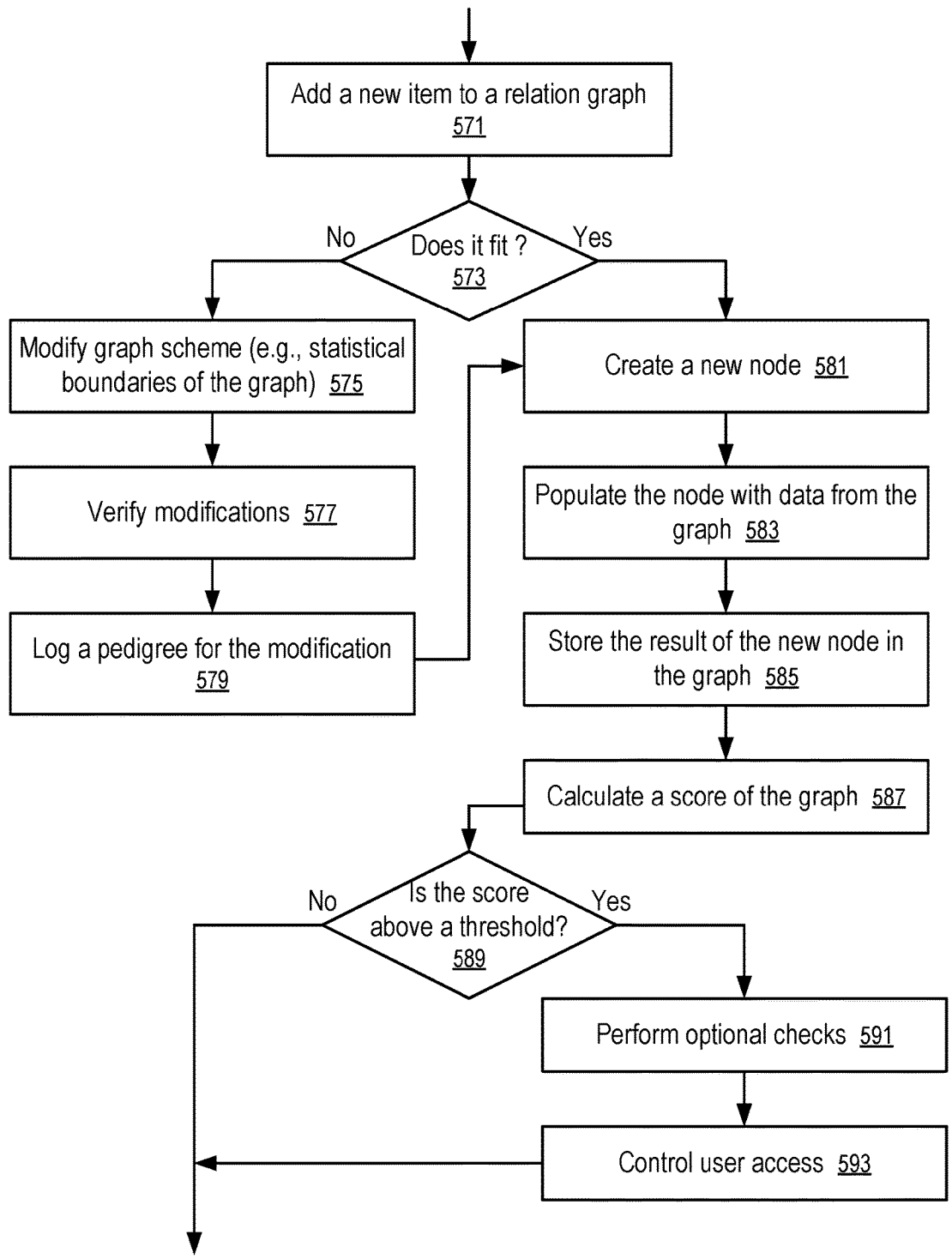
FIG. 23 shows a method of user authentication based on adding an element to a relation graph according to one embodiment.

In FIG. 23, the nodes identifying the elements of the graph include data indicative the quality of the information about the respective nodes, such as good, bad, unknown, very good, suspicious, etc.

In some instances, the links identifying the connections between elements of the graphs may optionally include additional information about the respective connections. For example, the link (561) between the nodes (e.g., 551 and 552) may include information indicating whether the link is bidirectional during an activity (e.g., a transaction) and/or the direction of the connection. Sometimes a set of information connects to another set both ways during an activity; and sometimes the two sets connect in only one direction. Links going in only one direction indicates that one set of information is derived from another set, or one set is linked to a different set during an activity but only in one direction.

For example, if a payment method is attached to a transaction and a payment address is included/used for the transaction, the association between the payment address and the payment method is considered strong as a result of the transaction, but the association between the IP address used to conduct the transaction and the payment method is not considered strong as a result of the transaction. Thus, the transaction and the IP address may be linked in the graph with a bidirectional connection, but the IP address and the payment method may be only loosely linked, therefore the link between the IP address and the payment method may not be bidirectional.

The information about the link directionality, whether bidirectional or one-way only, can be used subsequently for user authentication and/or access control, e.g., when a lookup is done to determine whether an IP address is linked to a payment method.

In some instances, the graph also stores information indicating the strength of a link/connection between two nodes/elements connected by the link/connection. The strength indicator can be derived from one or more activity records (e.g., for repeated observations of the relation in multiple activities).

For example, if an IP address is used for a fraudulent transaction, the information may indicate whether this payment was from that certain IP address or not.

The design and implementation of the tracking and recording of such information for the graph is further discussed below in greater detail.

In one embodiment, the graph as illustrated in FIG. 23 is a graphlet extracted from a large relation graph (239) (e.g., extracted using a technique as discussed in connection with FIGS. 8 and 9). In another embodiment, the graph is identified via a statistical cluster analysis of elements, activities, and/or transactions; and constructed from the items in a cluster identified from the statistical cluster. In a further embodiment, the graph is generated by incrementally adding related having connections to the existing elements in the graph when more activity records become available over a period of time. Certain restrictions may be used to limit or regulate the growth of the graph. For example, the graph may be limited by a maximum allowed number of degrees of separate from a newly added element to one or more key elements of interest for the graph.

For example, the metrics tracked and recorded for a graph may include: total entities that are attached to a person; total entities of a specific type that are attached to the person; total entities having a specific reputation that are attached to the person; and total entities of a specific type and having a specific reputation that are attached to the person.

For example, the metrics tracked and recorded for a graph may further include: total recent new entities that are attached to the person; total recent new entities of a specific type that are attached to the persons; total recent new entities having a specific reputation that are attached to the person; and total recent new entities of a specific type and having a specific reputation that are attached to the person.

In one embodiment, a recent time period is a 7-day period from the present time (or the time of the update of the metrics. The length of the recent time period can be contextually adapted to the circumstances. For example, in a very fast-paced transaction environment of online gaming, a recent time period may be shortened to the last 2 hours; online merchandise delivery, the recent time period can be the last week (e.g., "7 days").

For example, the metrics tracked and recorded for a graph may further include: total entities that are attached to a merchant; total entities of a specific type that are attached to the merchant; total entities having a specific reputation that are attached to the merchant; and total entities of a specific type and having a specific reputation that are attached to the merchant.

Other metrics may include, for example, total blacklisted entities in the graph, total counts of activities having undesirable results (e.g., chargeback and fraudulent refund), and a previous graph score.

In one embodiment, a score is computed for a graph/graphlet to indicate the risk of a transaction with entities contained within the graph. The calculation of the score takes into account various facets of the graph, by assigning different weights to each of the items measuring the facets of the graph. The weights can be tuned based on historic events and thus results in an artificial intelligence type of learning capability of the controller (101).

Example items measuring the facets of the graph include:
the total number of entities in the graph;
the reputation of the entities in the graph;
the growth rate of the graph;
the number of new entities added to the graph in a predetermined recent period (e.g., the last 7 days for online merchandise delivery, the last 2 hours for online gaming);
the breadth of the graph (e.g., the maximum degrees of separations between elements/nodes in the graph);
the depth of the graph (e.g., the maximum degrees of separations from one or more key elements of the graph to other elements in the graph);
the number of entities in the graph that are each blacklist;
the number of entities in the graph that are each sanctioned or members of sanction lists; and
the number of entities in the graph that have a specific category tag (e.g., drop shipper, fraud ring, identity theft).

Scoring, for example, uses a system of weighting of each of the aspect/faucet items. The controller uses the score of the graph/graphlet to produce a risk assessment for elements in the graph and/or control access and/or authenticate users based on the risk.

Some of the aspects can be industry specific type parameters, that are relevant only in one industry, but not in another. Typically, that would entail some or all of the items in the merchant category/subcategories and the resulting values/tags.

The weights and formula for the graph score can be tweaked to reduce the impact of criteria and/or parameters/facet items that are not as relevant for a specific use. For example, having a sanctioned entity within the graph but not a direct participant in a transaction may not be a concern of an anti-fraud operation in payment transactions. Thus, the score of the graph can be customized for various specific uses, such as customer onboarding, payment transaction anti-fraud, anti money laundering, sanctions screening, etc.

FIG. 23 shows a method of user authentication based on adding an element to a relation graph according to one embodiment. For example, the method of FIG. 23 can be implemented in a controller (101) of FIG. 4 in a system of FIG. 1 using a relation graph (239) of FIG. 6 and/or FIG. 22.

In FIG. 23, the controller (101) adds (571) a new item to a relation graph (239) in response to an incoming call, such as a transmission of the details (425) of an access (423) made by a user (e.g., 131) of a device (120) using an access token (403) illustrated in FIG. 16.

The graph (239) and the relevant data are stored in the data store of the controller (101). The data store may be a local store, or a cloud-based store. The data store may be in one location or distributed across a plurality of devices connected over a network, or any combination thereof.

In FIG. 23, the controller (101) determines (573) the new data item fits with the current schema of the graph (239); and if not, the controller (101) dynamically modify (575) the schema of graph to accommodate the insertion of the new item.

For example, the controller (101) of one embodiment modifies the statistical boundaries of the graph to accommodate the insertion of the insertion of the new item. In some cases, certain preset boundaries may be statistically adapted and dynamically modified, based on calculations of averages, etc. As each access activity (e.g., transaction) is added to the graph, some boundaries may be slightly moved, due to shifting upper and lower boundaries and shifting averages. Such modifications may be done on a per transaction basis or by periodic recalculation (daily, weekly, monthly, etc.). In some other cases, an analysis modification is performed to create additional statistical boundary information, so additional information and data and/or meta data and their subsets containing relevant information about newly added information may be added for storage in both nodes/elements and vectors/links/connections connecting the nodes/elements in the graph. After the modification, the controller (101) verifies (577) the modifications for data storage. Upon completion of the modification, the controller (101) logs (579) a pedigree in the form of a record indicating what has changed, and when, why, and how. The predigree can be logged and stored into the data store of the controller (101).

When the graph scheme can accommodate the insertion of the new item, the controller (101) creates (571) a new node for the new item and populates the new node with data received from a network (e.g., 231, 233, 235) regarding the new item. The network may be a private network (e.g., a transaction network, a merchant network, a banking network, a financial network, etc.), or a public network, or a combination of public and private networks. Some information may also be retrieved from data store of the controller.

The controller (101) stores (585) the result of the new node having the populated data in the graph back into the data store of the controller (and also in other places as appropriate).

In FIG. 23, the controller (101) calculates (587) a score of the graph and determines (589) where the score it exceeds a predetermined threshold.

If the graph score exceeds the threshold, the controller (591) performs (591) additional and/or optional checks for user authentication and controls (593) user access as a result. For example, the controller (101) may block the access (423) associated with the new item, set a flag for the graph and/or selected elements in the graph, and/or notify a relevant computing system (e.g., site (110) or service (411)) that the activity is suspicious or should be rejected/blocked/declined.

If the graph score is below the threshold, the controller (591) bypasses the operations (591 and 593). Thus, the use of the graph score against the threshold improves the overall efficiency of the system and/or the accuracy of the system in detecting fraudulent accesses.

Figure 24:
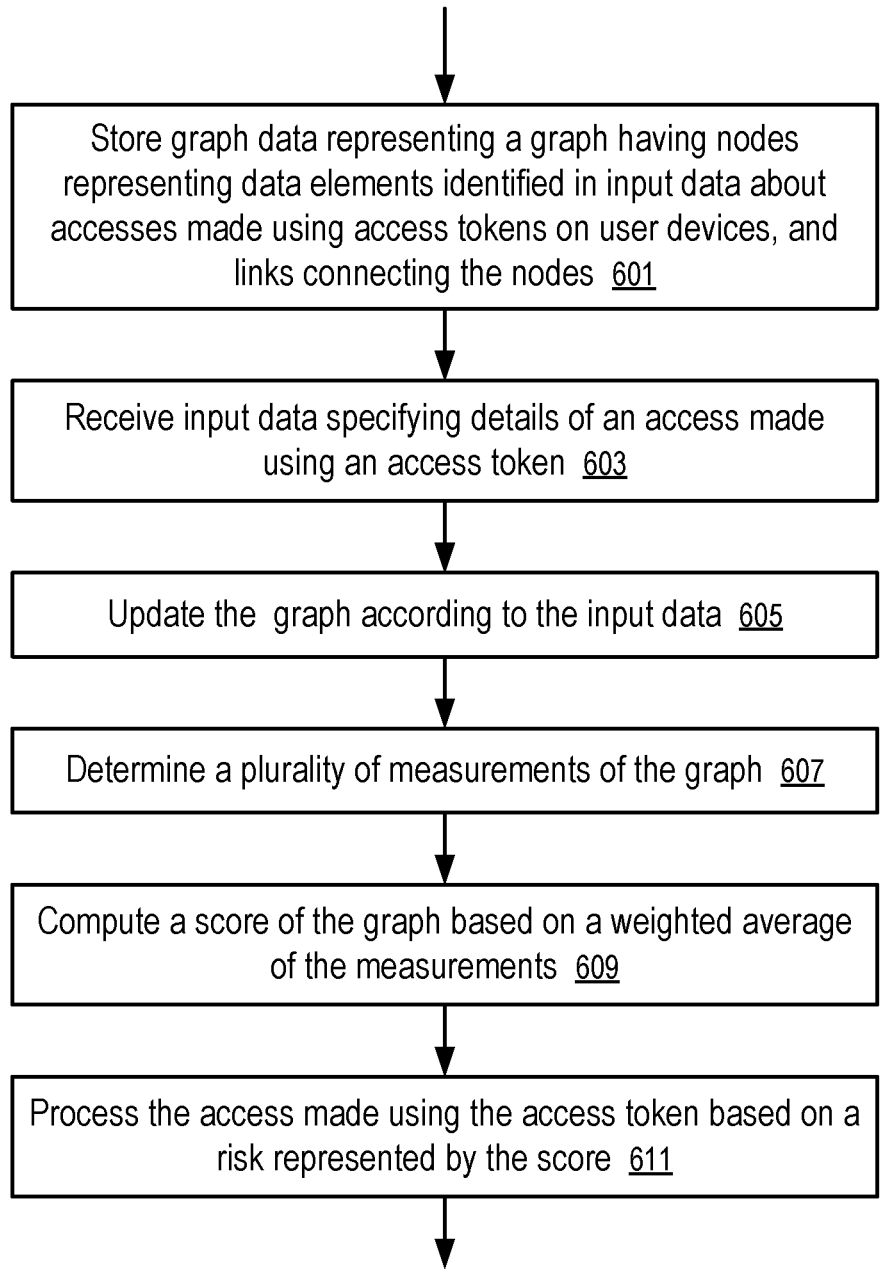
FIG. 24 shows a method of access control based on a graph score according to one embodiment.

FIG. 24 shows a method of access control based on a graph score according to one embodiment. For example, the method of FIG. 24 can be implemented in a controller (101) of FIG. 4 in a system of FIG. 1 using a relation graph (239) of FIG. 6 and/or FIG. 22.

In FIG. 24, the controller (101) is configured to store (601) graph data representing a graph (239) that has: nodes representing data elements identified in input data about accesses made using access tokens on user devices; and links connecting the nodes.

In response to receiving (603) input data specifying details (425) of an access (423) made using an access token (403), the controller (101) updates (605) the graph (239) according to the input data and determines (607) a plurality of measurements of the graph (239). After computing (609) a score of the graph (239) based on a weighted average of the measurements, the controller (101) processes (611) the access (423) made using the access token (403) based on a risk represented by the score.

In one embodiment, the controller (101) for user authentication and access control has: at least one microprocessor (145); a network interface (143) controlled by the at least one microprocessor (145) to communicate over a computer network (100) with at least one computing site (110); and memory (160) coupled with the at least one microprocessor (145).

The memory (160) stores graph data representing a graph (e.g., 239) having: nodes representing data elements associated with accesses made using access tokens; and links among the nodes representing connections between the data elements identified in collected data about the accesses.

The memory (160) further stores instructions which, when executed by the at least one microprocessor, cause the controller (101) to: receive, from the computing site (110), input data specifying details (425) of an access (423) made using an access token (403); update the graph according to the input data; determine a plurality of measurements of the graph (239); compute a score of the graph (239) based on a weighted average of the measurements; and process the access made using the access token based on the score.

For example, when the score is above a threshold, the controller (101) communicates with the computing site (110) to block or reject the access (423), or flag the access (423) for further or future investigation.

In one embodiment, the controller (101) adjusts the weights used in the weighted average by machine learning from historic events of access. Different sets of weights can be generated/customized for different types of access control applications, such as customer onboarding, fraud detection, illegal activity detection, screening for illegal or fraudulent activities based on sanction information, etc.

Examples of the measurements include a depth of the graph (239), a breadth of the graph (239), a growth rate (383) of the graph (239), a total count of user identities in the graph (239), a count of user identities that are in the graph (239) and have a predetermined type (e.g., based on tags assigned to the nodes representing the user identities, based on identifying user identities being on a list of a predetermine category, such as a fake user identity list or a suspicious user identity list, or based on a reputation attribute of user identities)

In some instances, the graph (239) is defined by one or more statistical boundaries; and the controller (101) determines whether new elements from the input data can fit within the statistical boundaries. If not, the controller (101) dynamically adjusts the statistical boundaries to accommodate insertion of nodes in the graph (239) according to the input data.

In other instances, the graph (239) can be identified for the update based on the access token (403), the identified user identity (401) of the access (423), and/or the identified device identity (409) of the access. In some instances, the graph (239) is generated based on a cluster of access activities after a cluster analysis is performed to identify the cluster from a large set of access activities. In some instances, the graph (239) is extracted from a larger graph generated from a large set of access activities, wherein the extraction is based on a node of interest selected according to the input data and a predetermined number of degrees of separation from the selected node (and/or other criteria).

For example, the controller (101) can be used to perform computerized intelligence alerts and unauthorized access detection by organizing contextual relationship information and/or other information collected from more than one source into a relation graph of data elements. The graph is limited to and/or identified by a set of statistical boundary information. The controller (101) adjusts the statistical boundary information to allow the insertion of new data elements in the graph and/or new connections between elements in the graph. When a new node/element and/or a new connection/link/vector is added to the graph, the controller (101) evaluates a score of the graph as a whole. If the score is above a predetermined threshold, the activity that causes the insertion of the new information into the graph is flagged for further investigation. The score of the graph can be calculated based items such as Total Entities in the graph, Total Entities By Type, Total Entities By Reputation, Total Entities By Type By Reputation, Recent new Entities, Recent new Entities by Type, Recent new Entities By Reputation, Recent new Entities By Type By Reputation, Total Entities at current Merchant, Total Entities at current Merchant By Type, Total Entities at current Merchant By Reputation, Total Entities at current Merchant By Type By Reputation, Total Blacklisted Entities, Total Chargeback/Fraud Refund Count, and/or previous Graph Score, etc. Also, the score be calculated further based on items such as Total number of entities, Reputation of entities, Growth rate of the graph, Number of new entities recently added, Breadth of the graph, Depth of the graph, Counts of Entities on one or more blacklists, Counts of Entities on sanction lists, Counts of entities having various tags (e.g., Drop shipper tag, Fraud ring tag, Identity Theft tag). Upon flagging an activity (e.g., a transaction), the controller issues an alert and/or take one or more other proactive actions, such as blocking the activity, notifying transaction partners and/or authorities as needed about the activity in question and the entity or entities involved.

Figure 25:
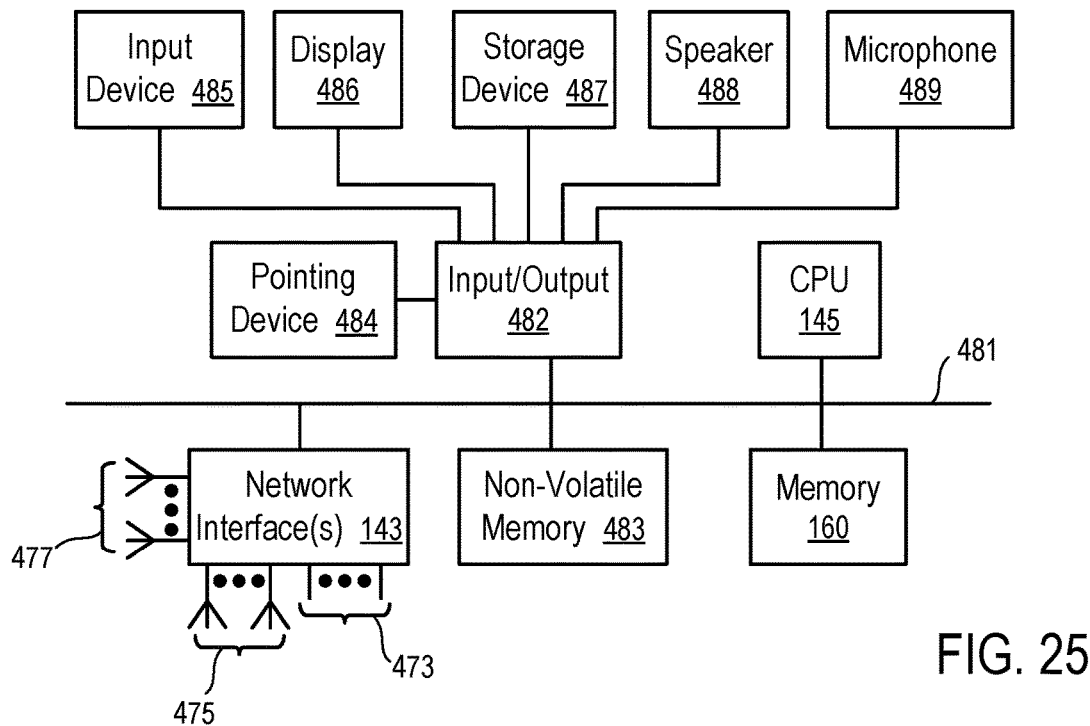
FIG. 25 shows a computing apparatus that can be used to implement the devices, sites, controllers and/or servers discussed in the present disclosure.

FIG. 25 shows a computing apparatus that can be used to implement the devices, sites, controllers and/or servers discussed in the present disclosure. The computing apparatus can be configured with program instructions and relevant data to implement a computing device (e.g., 120, 121, 123, ..., 125, ..., 129) or a computing site (e.g., 110, 111, 113, ..., 119), or the controller (101).

In FIG. 25, the computing apparatus includes a bus (481), a CPU (145), memory (160) and nonvolatile memory (NVM) (483) for holding programs and start-up code, etc., an input/output (I/O) section (482), a mass storage device (487) that can hold additional codes such as operating systems, applications, data, etc., and a network interface (s) (143), which may accommodate any of three groups (473, 475, 477) of network connections, such as wired local area network (LAN) connections (473), wireless local area network (WLAN) connections (475), and wide area network (WAN) connections (477).

Examples of wired LAN connections (473) include, but not limited to, Ethernet, serial port, FireWire, Thunderbolt, etc.

Examples of WLAN connections (475) include, but not limited to, Wi-Fi, Bluetooth, Zigbee, ultra wideband, etc.

Examples of WAN connections (477) include, but not limited to, cellular network connections of various different types using various different bands.

The computing apparatus of FIG. 25 may optionally include a display (486). Data input can be accomplished via an input device (485), which may be a touch screen, a physical keyboard, or both.

The computing apparatus of FIG. 25 may optionally include a pointing device (484), such as a mouse, a touch pad, a touch screen, a joy stick, or any combinations thereof.

The computing apparatus of FIG. 25 may optionally include other I/O devices, such as a speaker (488), a microphone (489), a camera, a thumb scanner, etc.

The input/output devices (e.g., 484-489) are connected to the bus (481) via the I/O section (482).

The computing apparatus of FIG. 25 can be configured in one of a wide variety of types, including, for example, a smart phone, a digital media player, a personal digital assistant, a computer pad, a laptop, a desktop, a work station, a server, etc.

The computing apparatus of FIG. 25 can be configured at least in part via software instructions to perform any of the methods disclosed herein. The present disclosure also includes non-transitory computer storage media storing the software instructions which, when executed on the computing apparatus, cause the computing apparatus to perform any of the methods.

Figure 26:
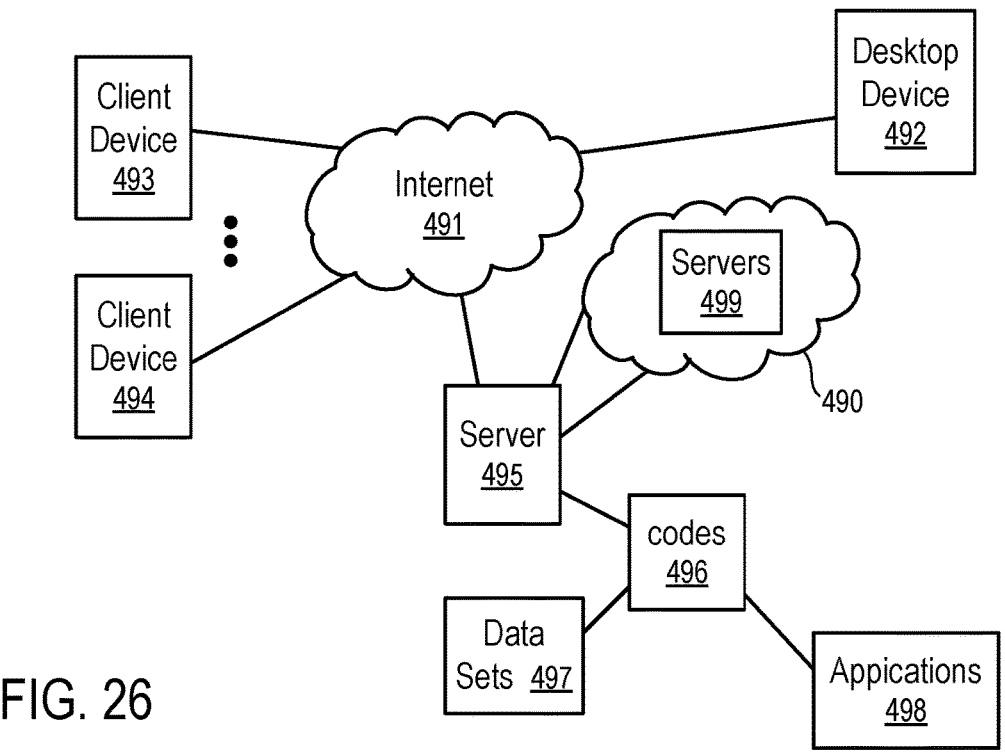
FIG. 26 shows a block diagram of a computing infrastructure associated with certain embodiments of the present disclosure.

FIG. 26 shows a block diagram of a computing infrastructure associated with certain embodiments of the present disclosure. The computing infrastructure of FIG. 26 can be used to provide the services offered by the computing sites (110, 111, 113, ..., 119) and/or the controller (101) connected by the network (100).

In FIG. 26, the computing infrastructure includes a server (495) which may be a single physical server or a cluster (490) of many smaller servers (499). These server(s) (490 or 499) can contain multiple sets of codes (496), including multiple operating systems, on top of which may be multiple applications (498) and additional multiple data sets (497) in storage. Client computing devices (493, ..., 494), as well as desktop devices (e.g., 492), connect to the server (495) via Internet (491).

Functionally a desktop computer is very similar to a smart phone, except that the relationship between performance and display and operating system, etc. is different; and a desktop computer has typically a much larger display.

Also, in the server (495), whether a single server or a cluster (490), each node is a specialized version of a computing apparatus (e.g., illustrated in FIG. 25). The cloud computer arrangement of FIG. 26 enables applications (498) to cooperate between one or more of the client devices (493, ..., 494) and the cloud represented by the server (495), where some functionality is performed in the cloud and some is on the device.

Further, it may not always be predetermined as to what operations are being done where, and operation locations can vary from situation to situation, as well as varying according the capabilities of the client computing device (e.g., 493, ..., 494) involved.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A controller for user authentication and access control, the controller comprising:
    at least one microprocessor;
    a network interface controlled by the at least one microprocessor to communicate over a computer network with at least one computing site; and
    memory coupled with the at least one microprocessor and storing:
        graph data representing a graph having:
            nodes representing data elements associated with accesses made using access tokens, including first nodes representing the access tokens and second nodes representing attributes of the accesses, and
            links among the nodes representing connections between the data elements identified in collected data about the accesses, including connects between the access tokens and the attributes of the accesses;
        instructions which, when executed by the at least one microprocessor, cause the controller to process an access made using an access token based on changes to the graph caused by the access, including:
            receive, from the computing site, input data specifying details of the access made using the access token;
            update the graph according to the input data of the access made using the access token;
            identify the changes in the graph resulting from updating the graph according to the input data of the access made using the access token;
            identify, for each respective change among the changes resulting from the updating of the graph caused by the access made using the access token, a first set of elements corresponding to nodes in the graph that are up to a first predetermined number of degrees of separation from the respective change;
            evaluate trustworthiness of first user identities corresponding to the first set of elements, wherein the trustworthiness of the first user identities is based on a trust score;
            process the access made using the access token based on the trustworthiness of the first user identities corresponding to the first set of elements; and
            in response to a determination that the trustworthiness of the first user identities does not meet a predetermined requirement:
                identify a second set of elements corresponding to nodes in the graph that are up to a second predetermined number of degrees of separation from the respective change, wherein the second predetermined number of degrees of separation is larger than the first predetermined number of degrees of separation;
                evaluate trustworthiness of second user identities corresponding to the second set of elements; and
                process the access made using the access token based at least in part on the trustworthiness of the second user identities corresponding to the second set of elements.

2. The controller of claim 1, wherein the trustworthiness of the first user identities is evaluated by comparing the first user identities to a list to determine whether any of the first user identities is on the list.

3. The controller of claim 2, wherein the list includes user identities of a predetermined category.

4. The controller of claim 3, wherein the predetermined category is one of: fake, and suspicious.

5. The controller of claim 1, wherein the second set of elements includes the first set of elements.

6. The controller of claim 1, wherein the predetermined requirement is based on a count of a subset of the first user identities that are on a list of user identities of a predetermined category.

7. The controller of claim 6, wherein the controller communicates with the computing site to block the access in response to a determination that a count of a subset of the second user identifies that are on the list is above a threshold.

8. The controller of claim 1, wherein the graph is identified for update based on the access token.

9. The controller of claim 1, wherein the graph is identified for update based on a user identity of the access.

10. The controller of claim 9, wherein the user identity is determined based on an electronic signature generated from the input data.

11. The controller of claim 1, wherein the graph is generated based on a cluster of access activities after identifying the cluster from a set of access activities using a statistical cluster analysis.

12. The controller of claim 1, wherein the graph is extracted from a second graph based on a node selected according to the input data and a predetermined number of degrees of separation from the selected node.

13. The controller of claim 1, wherein in processing the access made using the access token, the controller determines from the graph data a score representing a risk of the access being fraudulent.

14. A non-transitory computer storage medium storing instructions which when executed by a controller, cause the controller to perform a set of steps for user authentication and access control, the set of steps comprising:
 storing, in the controller coupled to a network, graph data representing a graph having:
  nodes representing data elements associated with accesses made using access tokens, including first nodes representing the access tokens and second nodes representing attributes of the accesses, and
  links among the nodes representing connections between the data elements identified in collected data about the accesses, including connects between the access tokens and the attributes of the accesses; and
 processing an access made using an access token based on changes to the graph caused by the access, by at least:
  receiving, in the controller over the network from a computing site, input data specifying details of access made using access token;
  updating, by the controller, the graph according to the input data of the access made using the access token;
  identifying, by the controller, the changes in the graph resulting from updating the graph according to the input data of the access made using the access token;
  identifying, by the controller for each respective change among the changes resulting from the updating of the graph caused by the access made using the access token, a first set of elements corresponding to nodes in the graph that are up to a first predetermined number of degrees of separation from the respective change;
  evaluating, by the controller, trustworthiness of first user identities corresponding to the first set of elements, wherein the trustworthiness of the first user identities is based on a trust score;
  processing, by the controller, the access made using the access token based on the trustworthiness of the first user identities corresponding to the first set of elements; and
  in response to a determination that the trustworthiness of the first user identities does not meet a predetermined requirement:
   identifying a second set of elements corresponding to nodes in the graph that are up to a second predetermined number of degrees of separation from the respective change, wherein the second predetermined number of degrees of separation is larger than the first predetermined number of degrees of separation;
   evaluating trustworthiness of second user identities corresponding to the second set of elements; and
   processing the access made using the access token based at least in part on the trustworthiness of the second user identities corresponding to the second set of elements.

15. A method for user authentication and access control, the method comprising:
 storing, in a controller coupled to a network, graph data representing a graph having:
  nodes representing data elements associated with accesses made using access tokens, including first nodes representing the access tokens and second nodes representing attributes of the accesses, and
  links among the nodes representing connections between the data elements identified in collected data about the accesses, including connects between the access tokens and the attributes of the accesses; and
 processing an access made using an access token based on changes to the graph caused by the access, by at least:
  receiving, in the controller over the network from a computing site, input data specifying details of the access made using the access token;
  updating, by the controller, the graph according to the input data of the access made using the access token;
  identifying, by the controller, the changes in the graph resulting from updating the graph according to the input data of the access made using the access token;
  identifying, by the controller for each respective change among the changes resulting from the updating of the graph caused by the access made using the access token, a first set of elements corresponding to nodes in the graph that are up to a first predetermined number of degrees of separation from the respective change;
  evaluating, by the controller, trustworthiness of first user identities corresponding to the first set of elements, wherein the trustworthiness of the first user identities is based on a trust score;
  processing, by the controller, the access made using the access token based on the trustworthiness of the first user identities corresponding to the first set of elements;
  making a determination by the controller that the trustworthiness of the first user identities does not meet a predetermined requirement; and
  in response to the determination:
   identifying, by the controller, a second set of elements corresponding to nodes in the graph that are up to a second predetermined number of degrees of separation from the respective change, wherein the second predetermined number of degrees of separation is larger than the first predetermined number of degrees of separation;
   evaluating trustworthiness of second user identities corresponding to the second set of elements; and
   processing the access made using the access token based at least in part on the trustworthiness of the second user identities corresponding to the second set of elements.

16. The method of claim 15, wherein the trustworthiness of the second user identities is based on a count of a subset of the second user identities that are on a list of user identities of a predetermined category.

17. The method of claim 15, wherein the trustworthiness of the first user identities is based on presence of the first user identities on a list of user identities of a predetermined category.

* * * * *